(12) United States Patent
Nowling et al.

(10) Patent No.: US 10,323,372 B1
(45) Date of Patent: Jun. 18, 2019

(54) FLOATING TURBIDITY BARRIER

(71) Applicants: Daryl Gene Nowling, Palm City, FL (US); Randall Jay Rust, Hollywood, FL (US)

(72) Inventors: Daryl Gene Nowling, Palm City, FL (US); Randall Jay Rust, Hollywood, FL (US)

(73) Assignee: RAIN TURTLE SERVICES, LLC, Palm City, FL (US)

( * ) Notice: Subject to any disclaimer, the term of this patent is extended or adjusted under 35 U.S.C. 154(b) by 0 days.

(21) Appl. No.: 15/911,158

(22) Filed: Mar. 4, 2018

Related U.S. Application Data

(60) Provisional application No. 62/633,572, filed on Feb. 21, 2018.

(51) Int. Cl.
*E02B 3/02* (2006.01)
*C02F 1/00* (2006.01)

(52) U.S. Cl.
CPC .............. *E02B 3/02* (2013.01); *C02F 1/001* (2013.01); *C02F 2201/008* (2013.01)

(58) Field of Classification Search
CPC combination set(s) only.
See application file for complete search history.

(56) References Cited

U.S. PATENT DOCUMENTS

| | | | |
|---|---|---|---|
| 3,852,978 A * | 12/1974 | Fossberg | E02B 15/08 405/67 |
| 4,752,393 A | 6/1988 | Meyers | |
| 4,781,493 A | 11/1988 | Fischer | |
| 5,054,960 A | 10/1991 | Manzano et al. | |
| 5,071,286 A * | 12/1991 | Separovich | E02B 15/08 405/66 |
| 5,102,261 A * | 4/1992 | Gunderson, III | E02B 15/06 405/70 |
| 5,165,821 A | 11/1992 | Fischer et al. | |
| 5,312,204 A | 5/1994 | Goans | |
| 5,374,133 A | 12/1994 | Lazes et al. | |
| 5,538,359 A | 7/1996 | Wadle et al. | |
| 5,580,185 A | 12/1996 | Ware | |
| 5,688,075 A | 11/1997 | Gradek | |
| 5,711,634 A | 1/1998 | Oberg | |
| 5,927,899 A | 7/1999 | Claesson | |
| 6,332,737 B1 | 12/2001 | Mattson | |
| 6,637,135 B2 | 10/2003 | Chesner et al. | |
| 6,640,470 B2 | 11/2003 | Chesner et al. | |
| 6,739,801 B2 | 5/2004 | Dreyer | |
| 6,743,367 B2 | 6/2004 | Dreyer | |
| 6,854,927 B2 | 2/2005 | Miyazaki | |
| 7,008,139 B2 | 3/2006 | Nilsen | |
| 7,326,354 B2 | 2/2008 | Ferreira | |
| 8,348,549 B2 | 1/2013 | Stiles et al. | |
| 8,439,601 B2 | 5/2013 | Lara | |
| 8,834,067 B2 | 9/2014 | Hubbell, Jr. | |
| 8,844,114 B2 | 9/2014 | Butterfield | |
| 8,915,673 B1 | 12/2014 | Taquino | |

(Continued)

*Primary Examiner* — Kyle Armstrong

(74) *Attorney, Agent, or Firm* — Woodling, Krost and Rust

(57) ABSTRACT

A floating turbidity barrier includes a first barrier section and a second barrier section. Velcro® is affixed to a portion of the first barrier and to a portion of the second barrier. The Velcro® of the first barrier section and the Velcro® of the second barrier section are connected together.

21 Claims, 17 Drawing Sheets

(56) References Cited

U.S. PATENT DOCUMENTS

2003/0072616 A1\* 4/2003 Dreyer .................... E02B 15/06
                                                    405/70
2011/0110721 A1\* 5/2011 Martin .................... E02B 15/08
                                                    405/63

\* cited by examiner

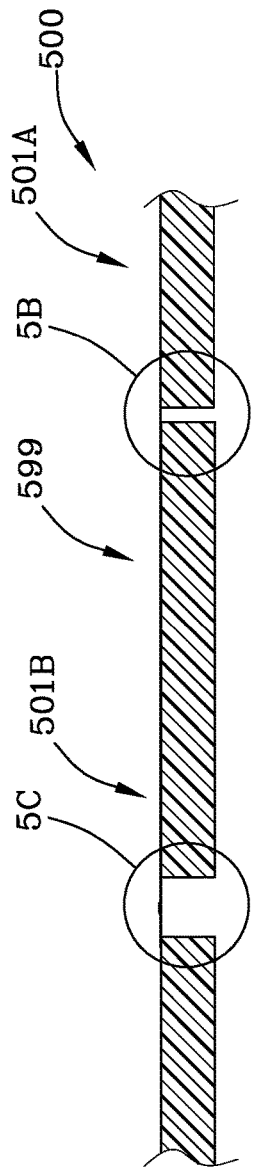

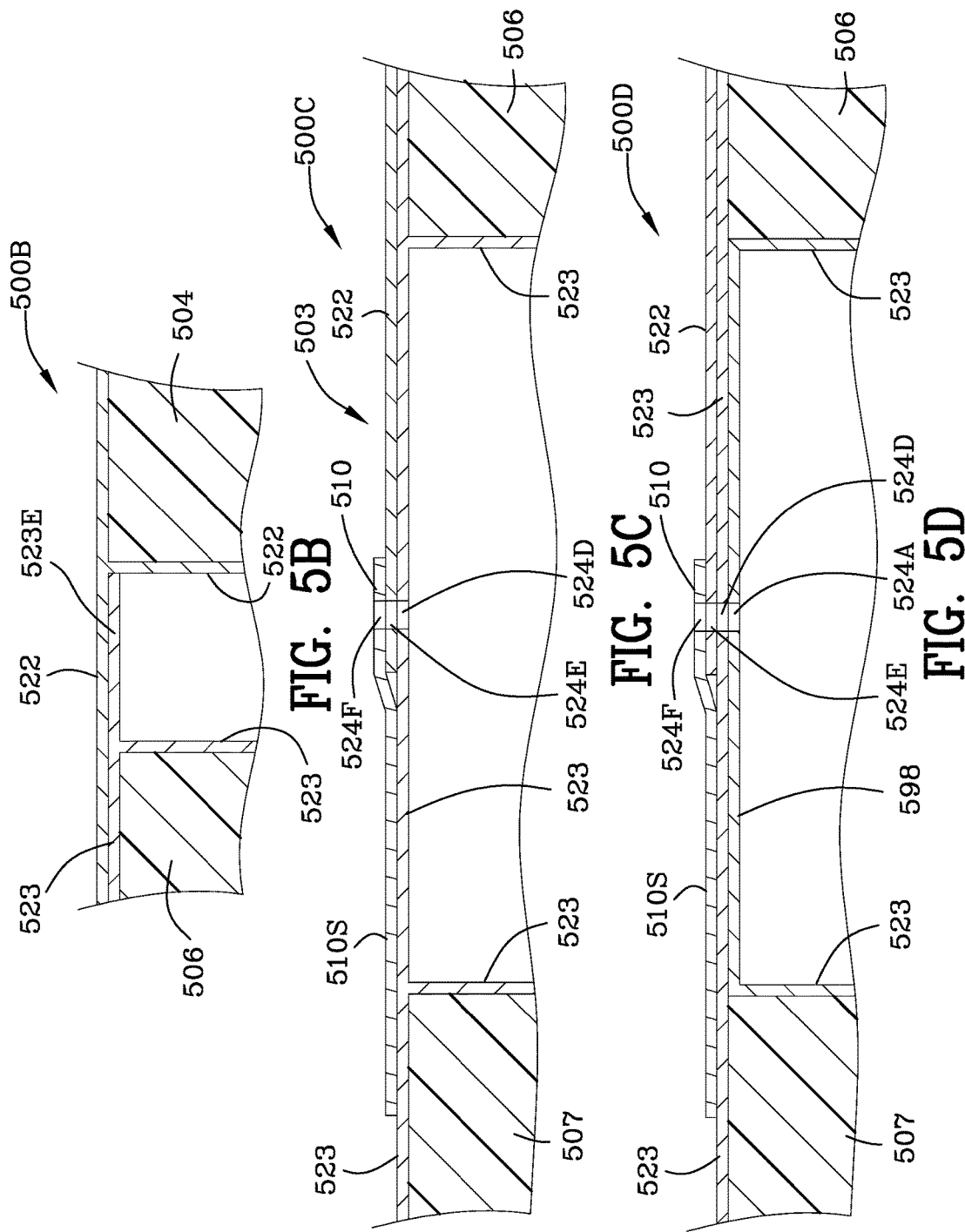

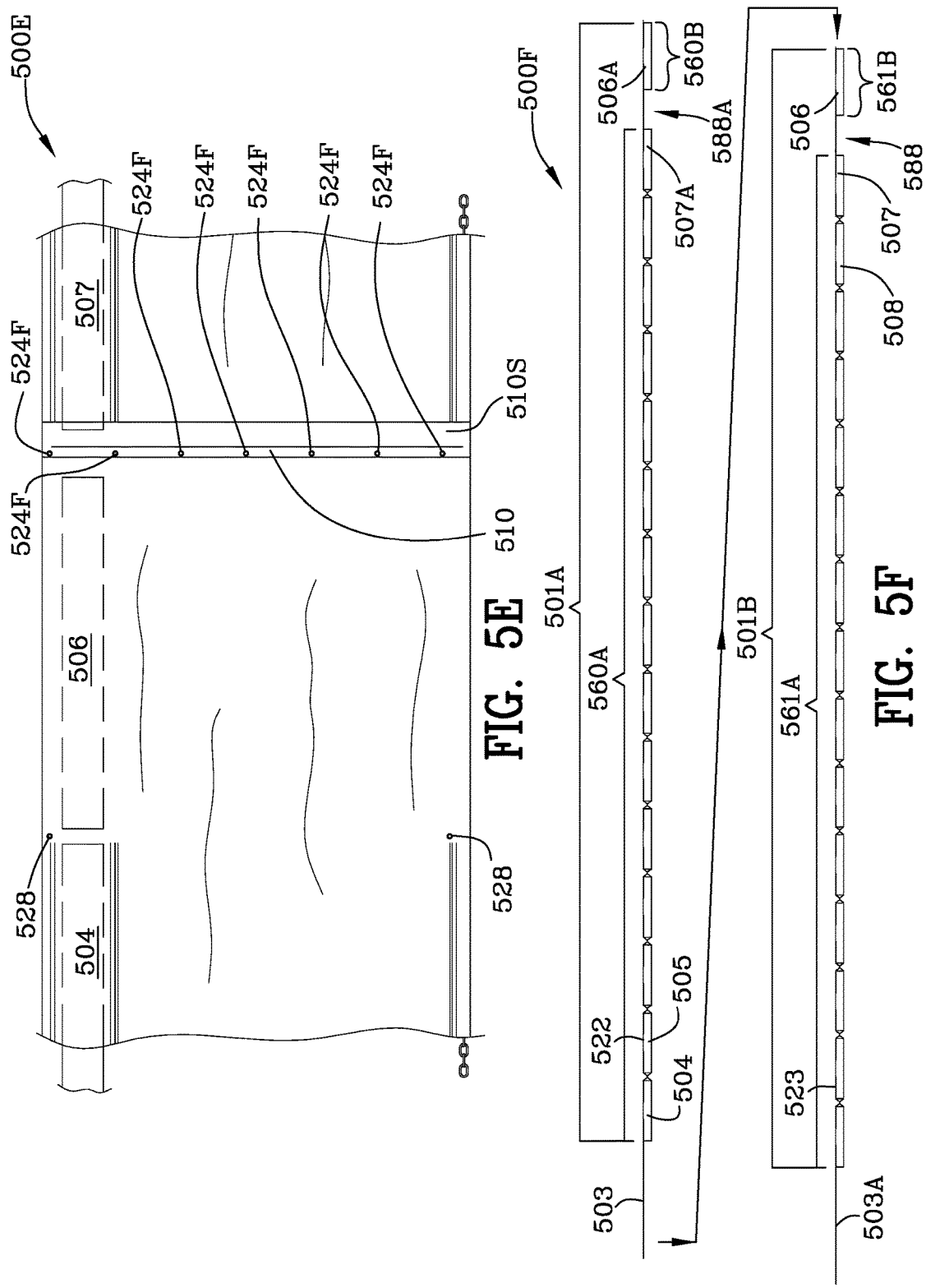

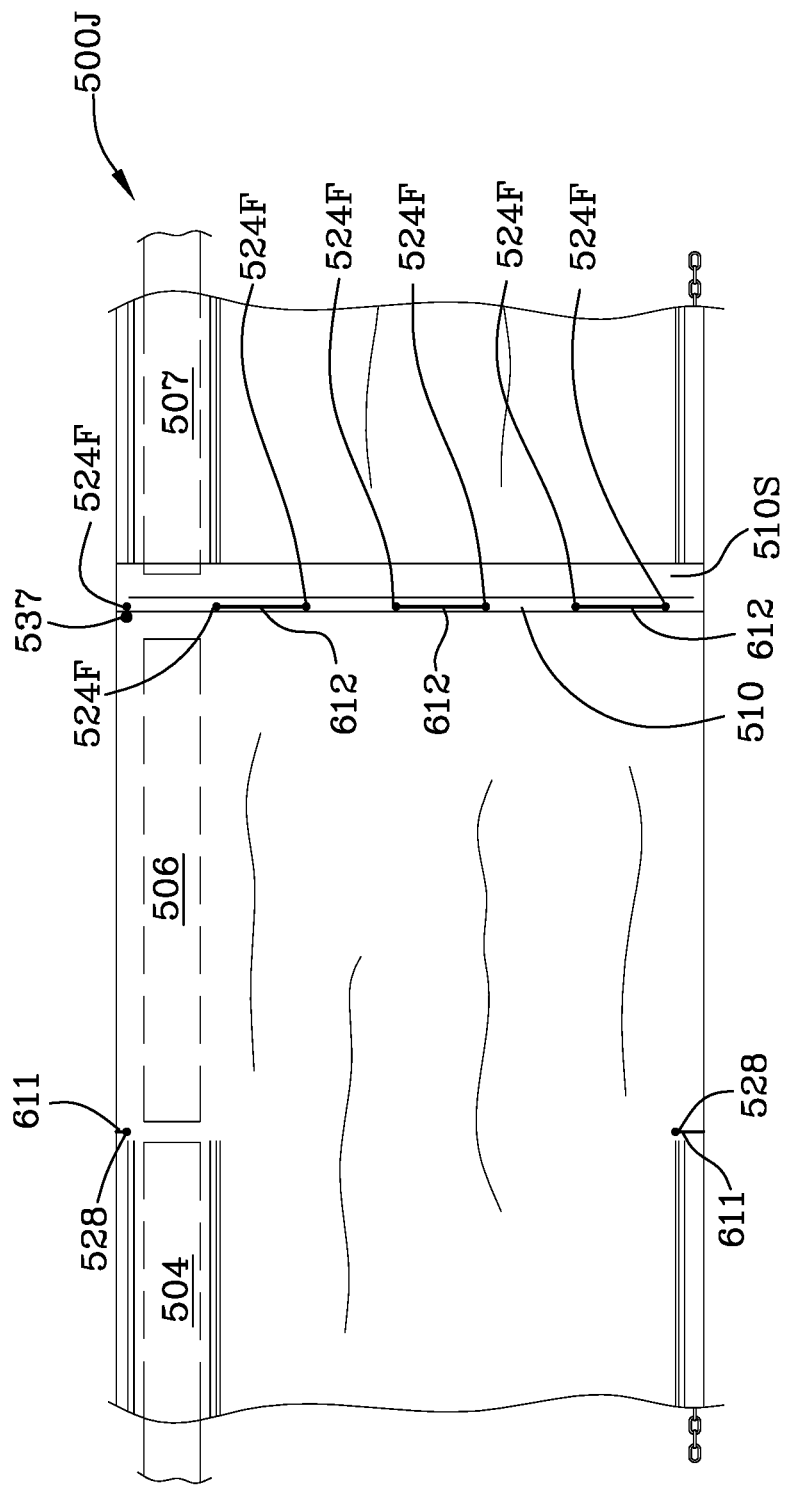

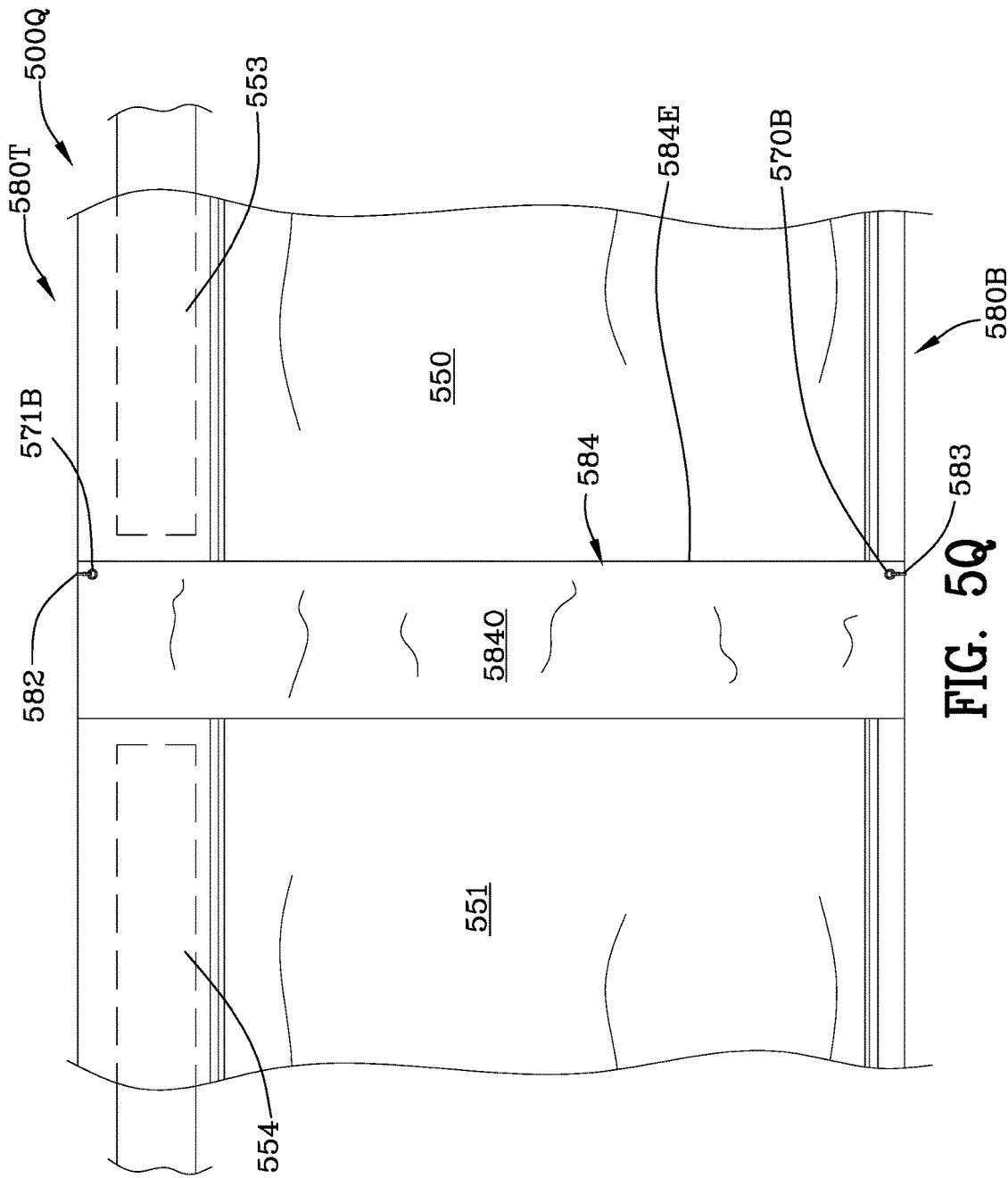

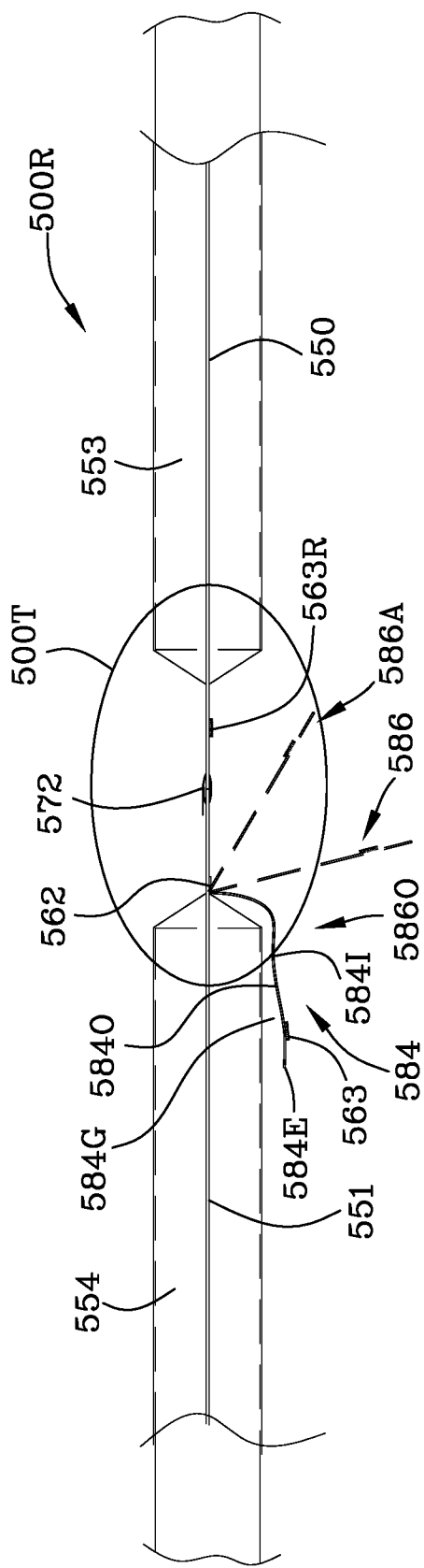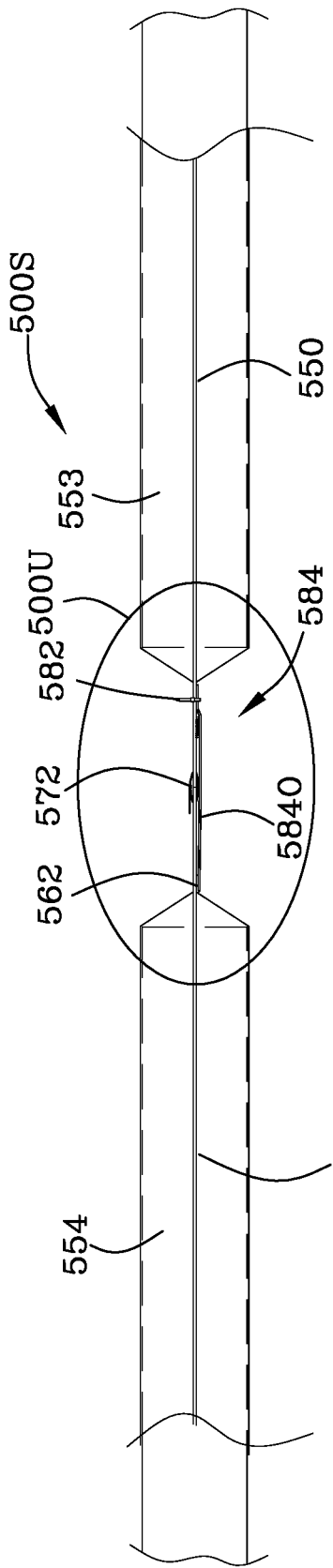

US 10,323,372 B1

FLOATING TURBIDITY BARRIER

This application claims the benefit of and the priority to U.S. provisional patent application Ser. No. 62/633,572 filed Feb. 21, 2018. Further, U.S. provisional patent application Ser. No. 62/633,572 filed Feb. 21, 2018 is incorporated herein by reference hereto.

FIELD OF THE INVENTION

The invention is in the field of turbidity barriers used to control silt, pollutants and other unwanted substance in or around water.

BACKGROUND OF THE INVENTION

One function of a turbidity barrier is to control silt, pollutants and other unwanted substance sin or around water. In manufacturing a construction road, silt and other materials (including pollutants) are suspended in water that may naturally occur where the road is being built. Turbidity barriers are placed within the water to create a confined zone of contained materials.

Contained areas allow marine contractors to stay within Federal and State Clean Water Act and NPDES Floating turbidity barriers (also known as curtains) are the most practical and economical way to control silt and turbidity while working in or around water. Silt, pollutant and sediment control created during dredging and marine construction activities are controlled. Floating turbidity curtains are sometimes called barriers and comply with government requirements regarding water pollution control. Most often these curtains are used in swamps, ponds, lakes, canals and waterways with light wind or current.

Turbidity barriers, also referred to as silt curtains, are floating barriers that are designed to control various sediments or runoff. There are a variety of calm water applications including but not limited to ponds, calm water lakes, swamps, construction sites, roadside construction projects, and protected inland areas.

So-called type 1 turbidity curtains are suitable for use in protected waters where the effects of wind, waves, and current are minimal. Usually, each section of a floating turbidity curtain includes PVC-coated polyester fabric, bottom tension/ballast member (usually a chain) for tying sections of the curtain together and foam flotation member (for instance 6 inch$^2$ or 8 inch$^2$ polystyrene in sealed float cavities). The float may be square, rectangular or cylindrical in cross section. Typically sections of the floating turbidity curtain are 50 or 100 feet long and sections are connected end to end. The ballast chain is shackled section-to-section on the turbidity curtains.

The ends of each section are typically tied together by lacing grommets with reinforced rope. Tension/ballast is usually galvanized steel chain. A grommet is a ring or edge strip inserted into a hole through plastic material which is used as the principal material in the turbidity barrier. Grommets are generally flared or collared on each side to keep them in place. Grommets are often made of metal, plastic, or rubber. They are used to prevent tearing or abrasion of the pierced material and they also protect the device used to secure one barrier section to another barrier section. The device used to secure the sections of the barrier together may be a wire, cable, rope or other material which penetrates the material of the section.

Barrier section lengths can be any length but typically are 50 feet or 100 feet long. The depth of the barrier can be selected. One such depth is 5 feet.

A variety of materials may be used for the curtain/barrier. For example, 18 oz/sq yd PVC laminated polyester fabric may be used. The curtain/barrier may include a filter fabric through a portion of the curtain/barrier.

So-called type 2 turbidity curtains are suitable for use in rivers, inland waterways, harbors, swamps, and lakes with wind and or current. The curtains control and contain silt and turbidity in moving water applications. Typically type 2 curtains use high strength fabric with heavy duty tension members and aluminum stress plates at the bottom skirt corners. These type 2 turbidity curtains are used in applications involving mild current and wind.

Heavier 22 oz/sq yd PVC-coated polyester fabric may be used in type 2 turbidity curtains. Type 2 turbidity curtains may use floats which are 6 inch$^2$ to 10 inch$^2$ in sealed float cavities. The float may be square, rectangular or cylindrical in cross section. The type 2 turbidity barrier may be use a galvanized steel cable polyethylene tube. A suitable bottom tension and ballast of sufficient strength is used. End connectors may be high strength aluminum located at the float and top tension cable. Lacing grommets are also used to secure barrier sections together. Chain ends are connected together at the bottom of the barrier sections. Steel cable contained in a polyethylene tube provides top tension and bottom tension and ballast is provided by a galvanized steel chain. End connectors at the float and top tension cable. Type 2 barriers are usually used with sections 50 to 100 feet length and can be deeper than the type 1 barriers.

Type 3 turbidity barriers are heavy duty use heavy duty tension members above and below the flotation and at the bottom of the curtain. Stress plates are at the bottom corners of the barrier sections. Type 3 curtains are used for silt, sediment control during dredging and marine construction activities in rivers, bays and waterways with moderate current, wind and wave activity. In general type 3 barriers may use components similar to the type 2 barriers with stronger or larger components. For example, heavier plastic fabric such as 40-oz PVC fabric may be used.

SUMMARY OF THE INVENTION

A floating turbidity barrier includes a first barrier section and a second barrier section. The second barrier section includes a least two floats spaced apart from each other. The first barrier section and the second barrier section are connected between the two spaced apart floats of said second section. The first barrier section includes a first connection layer overlapping the one of the two spaced apart floats and extends into the space separating the two spaced apart floats of the second section. The first and second barrier sections are secured together in the space separating the two spaced apart floats. The barrier sections can also be secured together in other places where the first connection overlaps the two floats.

The first barrier section includes a first top portion, a first bottom portion and a first length. The first barrier section includes a first plurality of floats and the second barrier section includes a second plurality of floats. The second barrier section includes a second top portion, a second bottom portion and a second length. The first plurality of floats of the first barrier section linked together, a first portion of the first plurality of floats are linked together in proximity with each other, a second portion of the first plurality of floats comprises one float; and, the one float of the second portion of the first plurality of floats linked together with, and, spaced apart from, the first portion of the first plurality of floats.

The second plurality of floats of the second barrier section linked together, a first portion of the second plurality of floats are linked together in proximity with each other, a second portion of the second plurality of floats comprises one float; and, the one float of the second portion of the second plurality of floats linked together with, and, spaced apart from, the first portion of the second plurality of floats.

The first barrier section includes a first encapsulation layer. The first encapsulation layer encapsulating the first plurality of floats, the first encapsulation layer extending about the first plurality of floats of the first barrier section and above the first plurality of floats to the top portion of the first barrier section and below the first plurality of floats to the bottom portion of the first barrier section, and, the first encapsulation layer includes a first lateral extension extending laterally beyond the first plurality of floats for connection with the second barrier section.

The second barrier section includes a second encapsulation layer. The second encapsulation layer encapsulating the second plurality of floats, the second encapsulation layer extending about the first plurality of floats of the second barrier section and above the plurality of floats to the top portion of the second barrier section and below the plurality of floats to the bottom portion of the second barrier section; and, the first plurality of floats, and, the second encapsulation layer includes a second lateral extension extending laterally beyond the second plurality of floats.

The first encapsulation layer includes a first flap. The first flap is partially heat sealed to the first encapsulation layer, the partially heat sealed first flap extends from the top portion of the first barrier section to the bottom portion of the first barrier section.

The second encapsulation layer includes a second flap, the second flap is partially heat sealed to the second encapsulation layer, the partially heat sealed second flap extends from the top portion of the second barrier section to the bottom portion of the second barrier section.

The first lateral extension of the first encapsulation layer overlaps and engages the second encapsulation layer of the second barrier section. The first lateral extension of the first encapsulation layer partially resides between the second flap of the second encapsulation layer and the second encapsulation layer.

The second flap engages the first lateral extension of the first barrier section. The second flap, the first lateral extension of the first encapsulation and the second encapsulation layer include apertures therein secured together thus securing the first and the second barrier sections together.

Rope may be used through the apertures of the second flap, the apertures of the first lateral extension of the first encapsulation and the second encapsulation layer to secure the second flap, the first lateral extension of the first encapsulation and the second encapsulation layer.

Alternatively, zip ties may be used through the apertures of the second flap, the apertures of the first lateral extension of the first encapsulation and the second encapsulation layer to secure the second flap, the first lateral extension of the first encapsulation and the second encapsulation layer.

Alternatively, plugs may be used through the apertures of the second flap, the apertures of the first lateral extension of the first encapsulation and the second encapsulation layer to secure the second flap, the first lateral extension of the first encapsulation and the second encapsulation layer.

BRIEF DESCRIPTION OF THE DRAWINGS

FIG. 5 is a schematic cross-sectional view of the first and second sections of the turbidity barrier taken along the lines 5-5 of FIG. 5A of the first embodiment.

FIG. 5A is a schematic front view of the first and second sections of the of the turbidity barrier 599 of the first embodiment.

FIG. 5B is an enlarged portion of a portion of FIG. 5.

FIG. 5C is an enlarged portion of a portion of FIG. 5.

FIG. 5D is a view similar to FIG. 5C illustrating a second encapsulation layer in the connection.

FIG. 5E is a schematic back side view of the of the turbidity barrier.

FIG. 5F is a view illustrating a plurality of floats in the first barrier section and the second barrier section in the uncoupled state.

FIG. 5J is a view similar to FIG. 5E illustrating rope in the apertures of the primary connection and zip ties in the apertures of the secondary connection securing the flap, first encapsulation layer and second encapsulation layer together.

FIG. 5Q is a front view of the first barrier section and the second barrier section connected together with the flap closed.

FIG. 5R is a top view of the first barrier section and the second barrier section connected to each other with the flap illustrated in several positions as it is closed.

FIG. 5S is a top view of the first barrier section and the second barrier section connected to each other with the flap closed.

DESCRIPTION OF THE INVENTION

Figure 1:
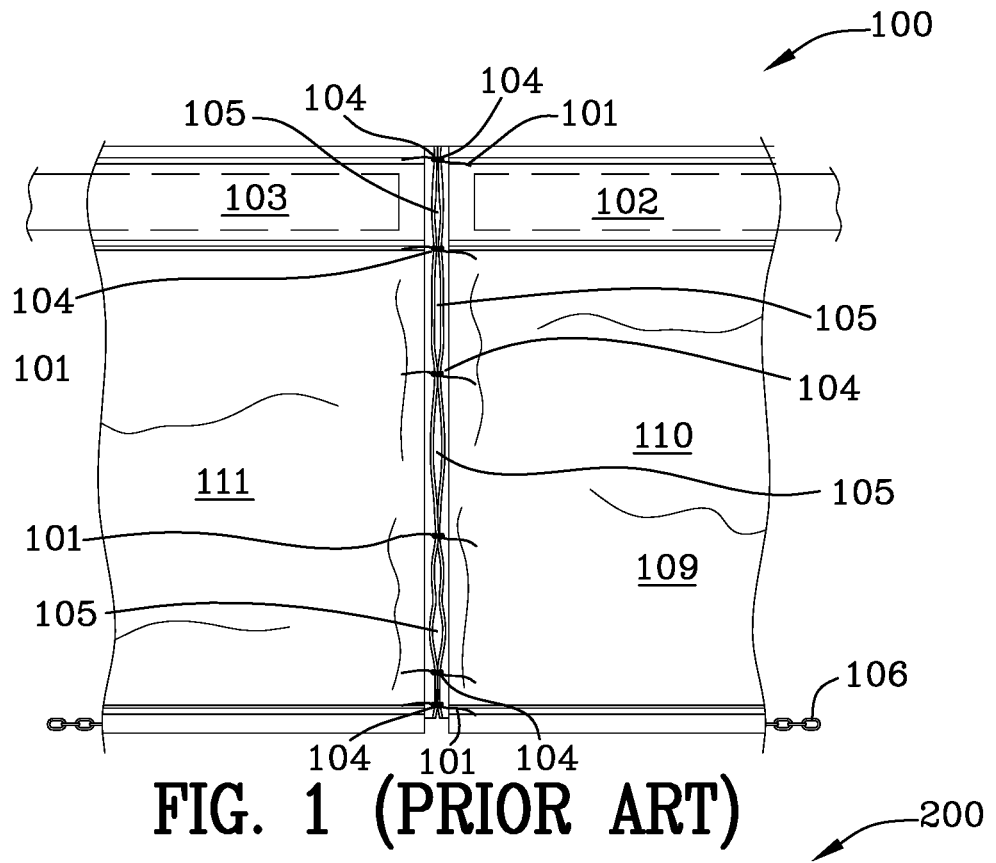
FIGS. 1-3 are front views prior art turbidity barrier sections connected together.
Figure 2:
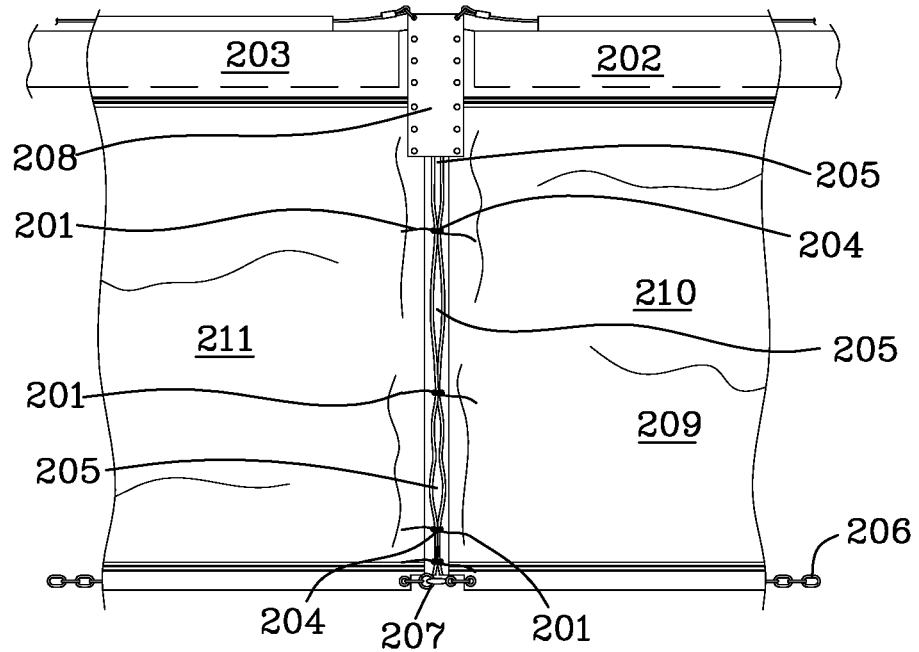
Figure 3:
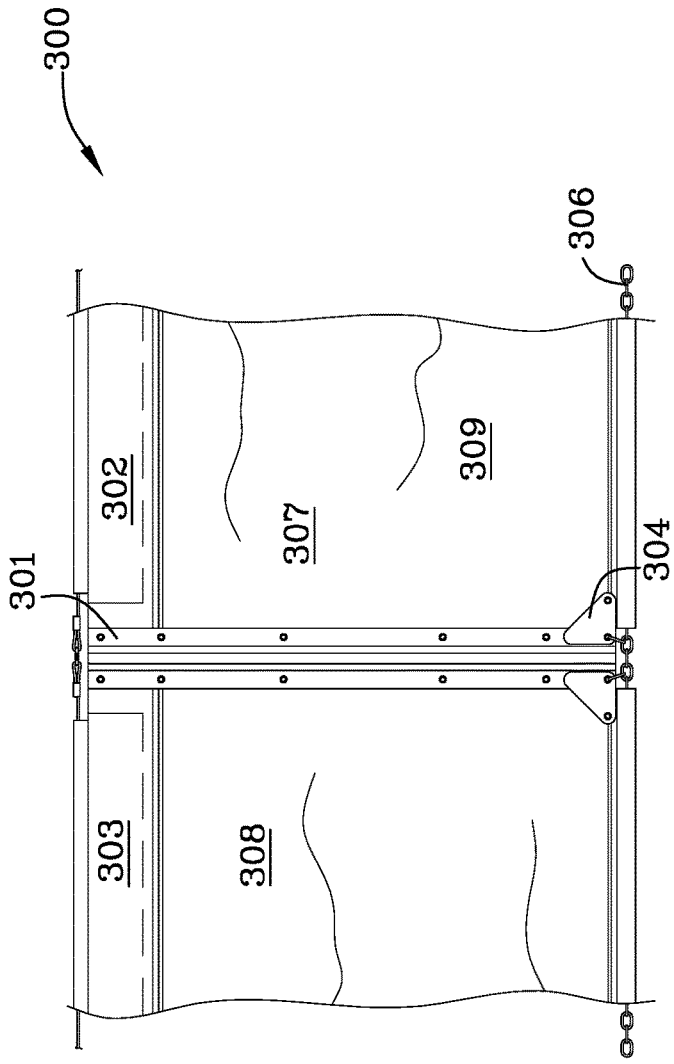

FIGS. 1-3 are front views 100, 200, 300 of prior art turbidity barrier sections connected together. Referring to FIG. 1, turbidity barrier sections 110, 111 are supported by floats 102, 103 sealed within the upper portion of the turbidity barrier sections. Reference numeral 181 represents the heat sealed portions of the PVC coated fabric 109, 109A. PVC stands for polyvinylchloride. Turbidity barrier sections 110, 111 are secured loosely together by reinforced rope 101 which resides in and through eyelets 104. Chain 106 resides in a sealed portion 181 of the barrier sections. Gaps 105 exist between the barrier sections 110, 111 and thus let floating contaminants through the turbidity barrier.

FIG. 2 is a front view 200 of prior art turbidity barrier sections connected together. FIG. 2 is similar to FIG. 1 in that floats 202, 203 are sealed 181 into cavities. FIG. 2 also employs a large connecting metal plate at the top thereof which is mechanically fastened together. Referring to FIG. 2, turbidity barrier sections 210, 211 are supported by floats 202, 203 sealed within the upper portion of the turbidity barrier sections. Reference numeral 181 represents the heat sealed portions of the PVC coated fabric 209, 209A. PVC stands for polyvinylchloride. Turbidity barrier sections 210, 211 are secured loosely together by reinforced rope 201 which resides in and through eyelets 204. Chain 206 resides in a sealed portion 181 of the barrier sections and separate eyelets at the bottom accommodate a second reinforcing chain 207. Gaps 205 exist between the barrier sections 210, 211 and thus let floating contaminants through the turbidity barrier.

FIG. 3 is a front view 300 of prior art turbidity barrier sections connected together. FIG. 3 is similar to FIG. 1 in that floats 302, 303 are sealed 181 into cavities. FIG. 3 also employs a large connecting metal plate that traverse the longitudinal height of the turbidity barrier. The metal plate 301 mechanically fastens the sections of the turbidity barrier together. Referring to FIG. 3, turbidity barrier sections 305, 306 are supported by floats 302, 303 sealed within the upper portion of the turbidity barrier sections. Reference numeral 181 represents the heat sealed portions of the PVC coated fabric 309, 309A. PVC stands for polyvinylchloride. Chain 306 resides in a sealed portion 181 of the barrier sections at the bottom thereof. The metal plate 301 is heavy and difficult to work with while standing in water.

Figure 4:
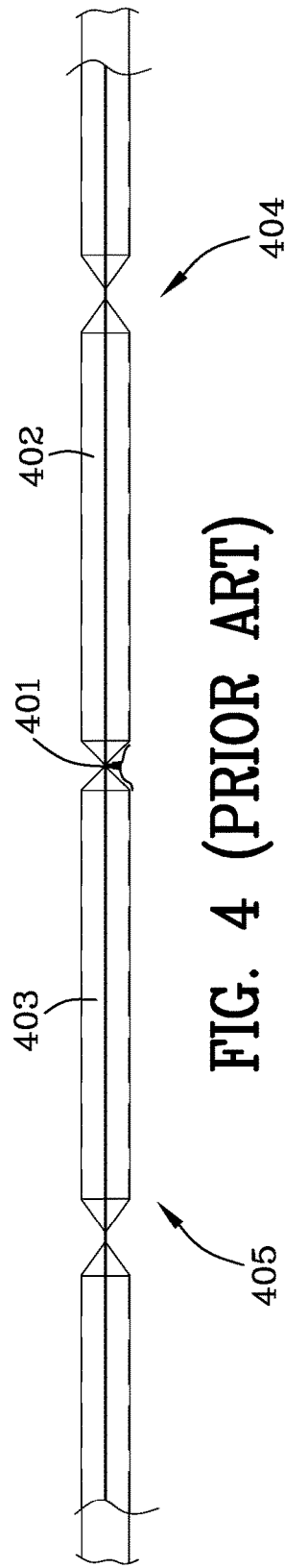
FIG. 4 is a schematic top view 400 of turbidity barrier sections connected together.

FIG. 4 is a top view 400 of turbidity barrier sections connected together. Two sections 404, 405 are shown in FIG. 4 centrally 401 connecting a plurality of barriers. Section lengths are typically 25, 50 or 100 feet in length. Only two floats 402, 403 are fully shown in FIG. 4.

FIG. 5 is a cross-sectional view 500 of the first section 501A and the second section 501B of the turbidity barrier 599 taken along the lines 5-5 of FIG. 5A. The turbidity battier 599 can comprise multiple barrier sections. For instance, there can be 50, 100 or 1000 sections connected together. Each section is typically 50 feet in length and may comprise numerous float sections. Floats are usually Styrofoam or similar buoyant materials. The WORK SITE is the place where the construction road work is being done and the PROTECTED ZONE is the protected environment.

FIG. 5F is a schematic top view 500F illustrating a plurality of floats in the first barrier section 501A and a plurality of floats in the second barrier section 501B. A gap 588 is illustrated in FIG. 5 where the primary connection of the first barrier section 501A and the second barrier section 501B is made. Another gap 588A is where the secondary connection of the first barrier section 501A and the second barrier section 501B is made. The first encapsulation layer 522 is PVC coated fabric and covers the first turbidity barrier section 501A. The second encapsulation layer 523 is PVC coated fabric and covers the second turbidity barrier section 501B. FIG. 5F illustrates the first barrier section 501A and the plurality of floats in a first portion 560A comprising several floats in proximity to each other and a second portion 560B comprising just one float 506A. FIG. 5F also illustrates the latitudinal extension 503. Similarly, FIG. 5F illustrates second barrier section 501B and the plurality of floats in a first portion 561A comprising several floats in proximity to each other and a second portion 561B comprising just one float 506. FIG. 5F also illustrates the latitudinal extension 503. Reference numeral 588 indicates the arrow pointing to the primary connection.

FIG. 5A is a schematic front view 500A of the first 501A and second 501B sections of the of the turbidity barrier 599. The first barrier section 501A includes a first top portion 521T, a first bottom portion 521B and a first length. The first barrier section 501A includes a first plurality of floats as illustrated in FIG. 5F. The second barrier section 501B includes a second plurality of floats as illustrated in FIG. 5F. The second barrier section includes a second top portion 520T, a second bottom portion 520B and a second length.

The first plurality of floats of the first barrier section 501A is linked together by the first encapsulation layer 522. The floats together with the encapsulation layer permit the barrier sections to bend freely and adjust to water conditions. The barrier sections are articulable between adjacent floats and also at the location where the barrier sections are connected. A first portion 560A of the first plurality of floats is linked together in proximity with each other. A second portion 560B of the first plurality of floats comprises one float 506A. The one float 506A of the second portion 560B of the first plurality of floats is linked together with, and, spaced apart 588 from, the first portion 560A of the first plurality of floats. Arrow 588A indicates a gap or space where the adjacent floats of the first barrier section are separated apart to enable connection of the first and another (not shown) barrier sections together.

The second plurality of floats of the second barrier section 501B is linked together. The first portion 561A of the second plurality of floats is linked together in proximity with each other. A second portion 561B of the second plurality of floats comprises one float 506. The one float 506 of the second portion 561B of the second plurality of floats is linked together with, and, spaced apart 588 from, the first portion 561A of the second plurality of floats. Arrow 588 indicates a gap or space where the adjacent floats of the second barrier section are separated apart to enable connection of the first and second barrier sections together.

The first barrier section 501A includes a first encapsulation layer 522. The first encapsulation layer 522 encapsulates the first plurality of floats. The first encapsulation layer 522 extends about the first plurality of floats of the first barrier section 501A and above the first plurality of floats to the top portion 521T of the first barrier section 501A and below the first plurality of floats to the bottom portion 501B of the first barrier section 501A. The first encapsulation layer 522 includes a first latitudinal extension 503 extending beyond the first plurality of floats for connection with the second barrier section 501B.

The second barrier section 501B includes a second encapsulation layer 523. The second encapsulation layer 523 encapsulating the second plurality of floats. The second encapsulation layer 523 extending about the first plurality of floats of the second barrier section 501B and above the plurality of floats to the top portion 520T of the second barrier section 501B and below the plurality of floats to the bottom portion 520B of the second barrier section 501B. The first plurality of floats, and, the second encapsulation layer 523 includes a second latitudinal extension 503A extending beyond the second plurality of floats.

The first encapsulation layer 522 of the first barrier section includes a first flap 511. The first flap is partially heat sealed 511S to the first encapsulation layer 522. The partially heat sealed first flap extends longitudinally (vertically) from the top portion 521T of the first barrier section 501A to the bottom portion 521B of the first barrier section 501A.

The second encapsulation layer 523 of the second barrier section includes a second flap 510. The second flap 510 is partially heat sealed 510S to the second encapsulation layer 523. The partially heat sealed second flap extends longitudinally (vertically) from the top portion 520T of the second barrier section 501B to the bottom portion 520B of the second barrier section 501B.

The first latitudinal extension 503 of the first encapsulation layer 522 overlaps and engages the second encapsulation layer 523 of the second barrier section 501B. The first latitudinal extension of the first encapsulation layer 522 partially resides between the second flap 510 partially affixed by heat welding 510S to second encapsulation layer 523 and the second encapsulation layer 523. The second flap 510 engages the first latitudinal extension of the first barrier section 501A.

The second flap 510, the first latitudinal extension of the first encapsulation and the second encapsulation layer include apertures 524F, 524E, 524D therein secured together thus securing the first 501A and the second 501B barrier sections together.

The sections 501A, 501B of the floating turbidity barrier 599 are secured with rope, and/or zip ties, and/or plugs through the apertures 524F of the second flap 510, the apertures 524E of the first latitudinal extension 503 of the first encapsulation layer 522, and the apertures 524D of the second encapsulation layer 523 to secure the second flap 510, the first latitudinal extension 503 of the first encapsulation layer 522 and the second encapsulation layer 523 together. The securement of the layers 510, 522, 523 with rope, and/or zip ties, and/or plugs through the apertures 524 seals the second flap 510, the first latitudinal extension 503 of the encapsulation layer 522, and the second encapsulation layer 523 together preventing the escape of water from the work site. See FIGS. 5F and 5G.

Figure 5G:
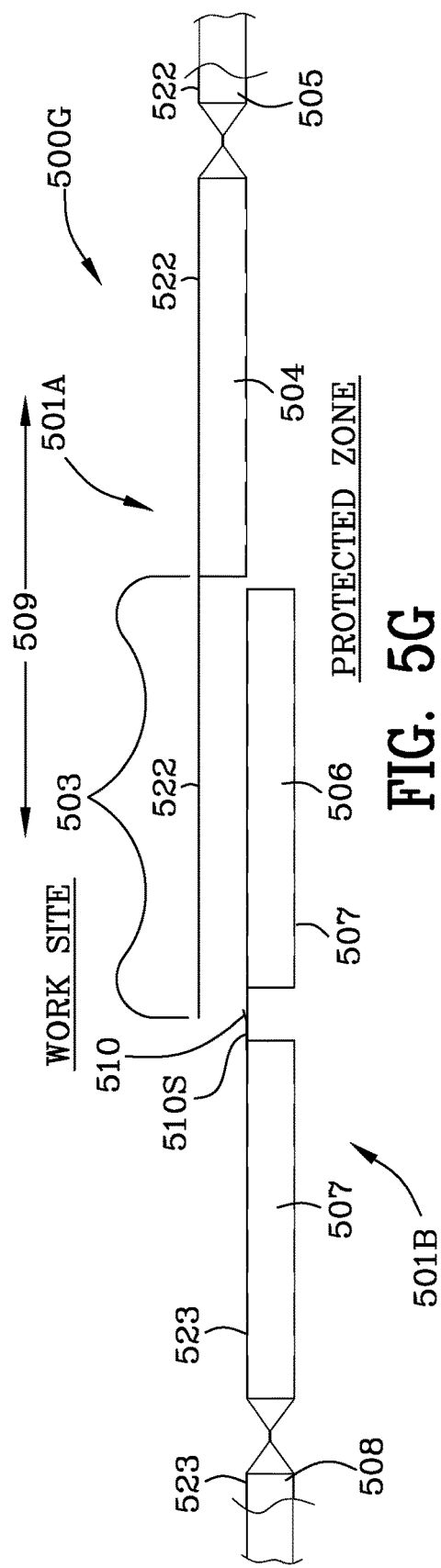
FIG. 5G is a schematic view of the first barrier section and the second barrier section in the uncoupled state.

FIG. 5G is a schematic view 500G of the first barrier section 501A and the second barrier section 501B in the uncoupled state. FIG. 5G illustrates the uncoupled state where the first barrier section 501A and the second barrier section 501B are separated apart. Arrow 509 illustrates the latitudinal direction and the longitudinal, or vertical, direction is orthogonal to the latitudinal direction. FIG. 5G illustrates the first barrier section 501A and the longitudinal extension 503 of the first encapsulation layer 522 before they are assembled together. The longitudinal extension 503 of the first encapsulation layer 522 is a PVC coated fabric covering the first turbidity barrier section 501A. The first encapsulation layer 522 and its extension 503 and the second encapsulation layer 523 are PVC coated fabric covering turbidity barrier section 501B. Referring to FIGS. 5, 5A, 5C, 5F, and 5G, space 588 between adjacent floats in the second barrier section 501B is illustrated. The space 588 is about 3 feet wide and the floats of the first barrier section 501A and the second section 501B are about 5 feet in length. The lengths of the space 588 and float lengths may be changed without departing from the spirit and scope of the instant invention. For road construction applications of the turbidity barrier in swampy conditions, the height of the turbidity barrier is about 5 feet. As used herein, height is sometimes referred to as the longitudinal direction.

Referring to FIGS. 5F and 5G, Interconnection of the first section 501A of the turbidity barrier and the second section 601B of the turbidity barrier 599 occurs in the space 588 between the one float 506 of the second portion 561B of the second plurality of floats linked together with, and, spaced apart from, the first portion 561A of the second plurality of floats of the second section 501B.

Referring to FIGS. 5F and 5G, it will noticed that the second portion 561B of the plurality of floats comprises just one float 506 which is in proximity to the first portion 560A of the first plurality of floats of the first barrier section 501A.

Figure 5H:
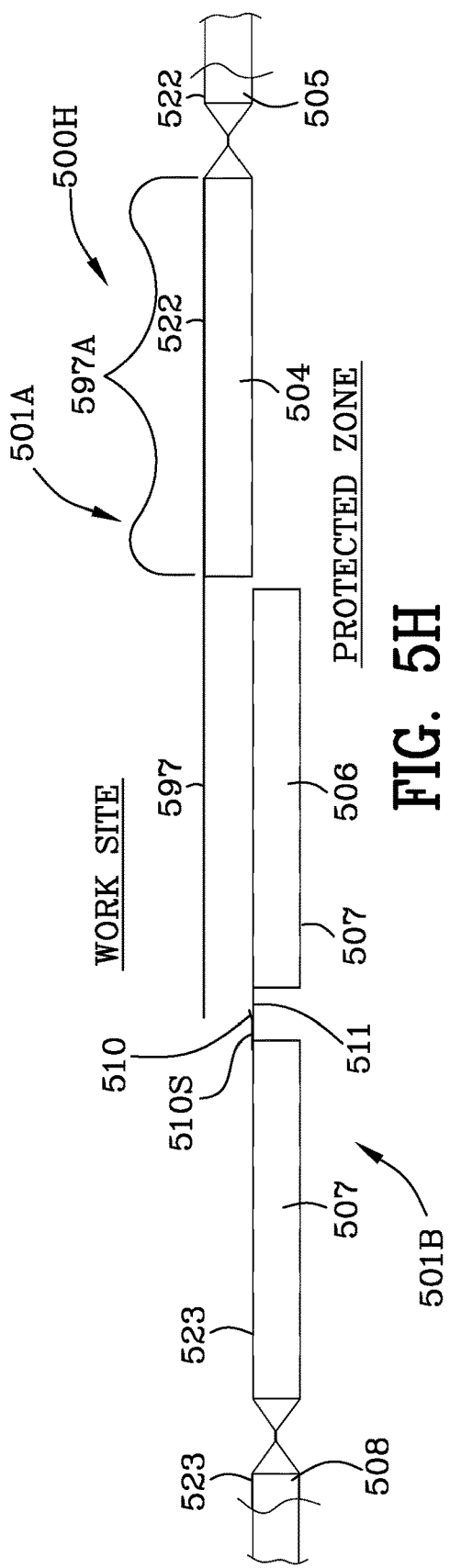
FIG. 5H is a schematic view similar to FIG. 5G with a connection layer affixed to the encapsulation layer of the first barrier section.

FIG. 5H is a schematic view 500H similar to FIG. 5G with a connection layer 597 heat welded to the encapsulation layer 522 of the first barrier section. Connection layer 597 may be made thicker than the encapsulation layer 522 for increased strength as desired for insertion in the second flap 510 as illustrated in FIG. 5H. FIG. 5H illustrates a portion 597A of connection layer 597 which is heat welded to the encapsulation layer 522.

Referring to FIG. 5A, apertures 527 exist in the second encapsulation layer 523 and referring to FIG. 5E, cooperating apertures 528 exist in the first encapsulation layer 522. The apertures 527 of the encapsulation layer are aligned with the apertures 528 and a connector such as a plug or a zip tie is utilized to additionally secure the first 501A and second 501B barrier sections together. Additionally, the apertures 527, 528 can be located closer to the primary connection located in the space 588 between the floats 506, 507. That is, the aperture 527 can be located above float 506 and aperture 528 can be located vertically below the aperture 527.

FIG. 5C is an enlarged portion 500C of a portion of FIG. 5 and illustrates the primary connection of the flap 510 overlapping, the extension 503 of the first encapsulation layer 522. The extension 503 resides between the flap 510 and the second encapsulation layer 523. The flap has a plurality of apertures 524F, the extension 503 of the first encapsulation layer 522 has a plurality of apertures 524E, and the second encapsulation layer 523 has a plurality of apertures 524D.

FIG. 5B is an enlarged portion 500B of a portion of FIG. 5 illustrating floats 504, 506 in close proximity to each other. A portion 523E of the second encapsulation layer 523 extends beyond float 506 as illustrated in FIG. 5B. The secondary connection is illustrated in FIGS. 5A and 5E at the location of apertures 527, 528. As stated before, the apertures 527, 528 can be moved closer to the primary connection illustrated in FIGS. 5A, 5C and others.

FIG. 5D is a view 500D similar to FIG. 5C illustrating a second encapsulation layer 598 in the connection which may be added for strength. Aperture 524A is in the additional layer 598 for alignment with apertures 524F, 524E and 524D.

FIG. 5E is a back side view 500E of the of the turbidity barrier 599 illustrating the apertures 524F in the flap 510. The sealed portion 510S of the flap 510 is also viewed in FIG. 5E.

Figure 6:
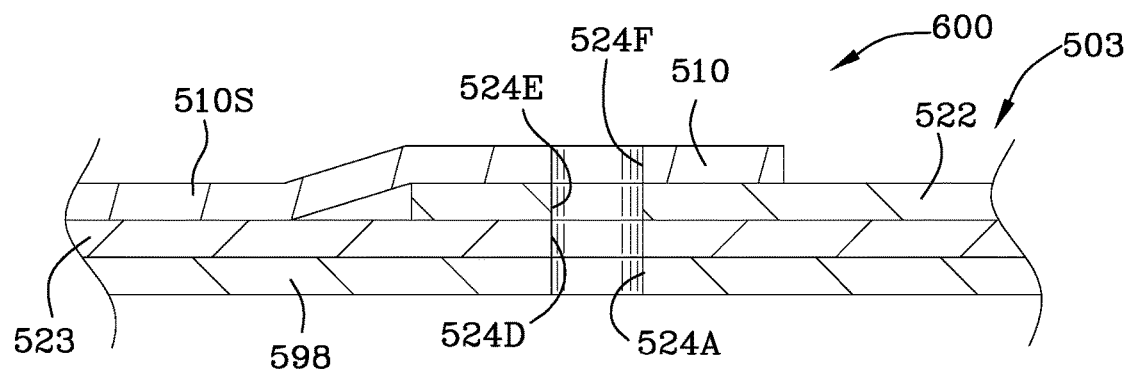
FIG. 6 is a schematic cross-sectional view of apertures in a flap, a first encapsulation layer, a second encapsulation layer and an additional second encapsulation layer aligned prior to a connector being inserted therein.

FIG. 6 is a schematic cross-sectional view 600 of apertures 524F in flap 510, apertures 524E in a first encapsulation layer 522, apertures 524D in a second encapsulation layer and apertures 524A in an additional second encapsulation layer. All of the apertures are aligned prior to a connector being inserted therein.

Figure 6A:
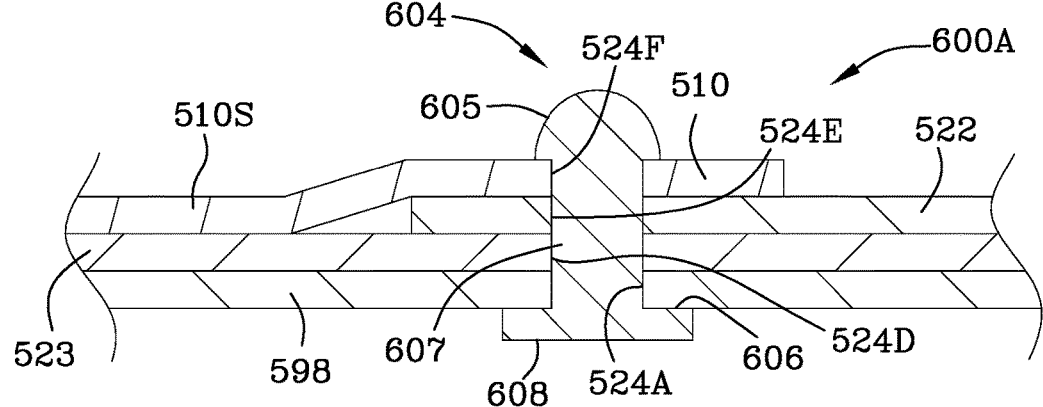
FIG. 6A is a schematic cross-sectional view similar to FIG. 6 together with a plug connector in the apertures.

FIG. 6A is a schematic cross-sectional view 600A similar to FIG. 6 together with a plug connector 604 in the apertures 524F, 524E, 524D and 524A.

Figure 6B:
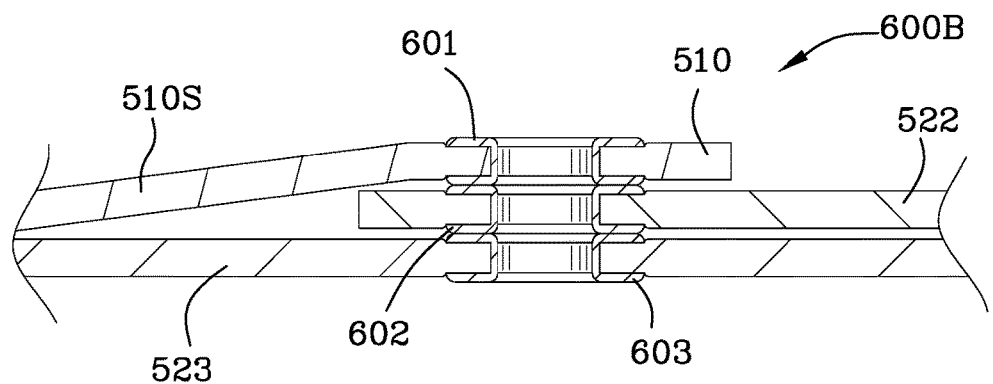
FIG. 6B is a schematic cross-sectional view with grommets illustrated in a flap, a first encapsulation layer and a second encapsulation layer aligned prior to a connector being inserted in the grommets therein.

FIG. 6B is a schematic cross-sectional view with grommets 601, 502, 603 illustrated in flap 510, first encapsulation layer 522 and second encapsulation layer 523. All of the apertures are aligned prior to a connector inserted therein.

Figure 6C:
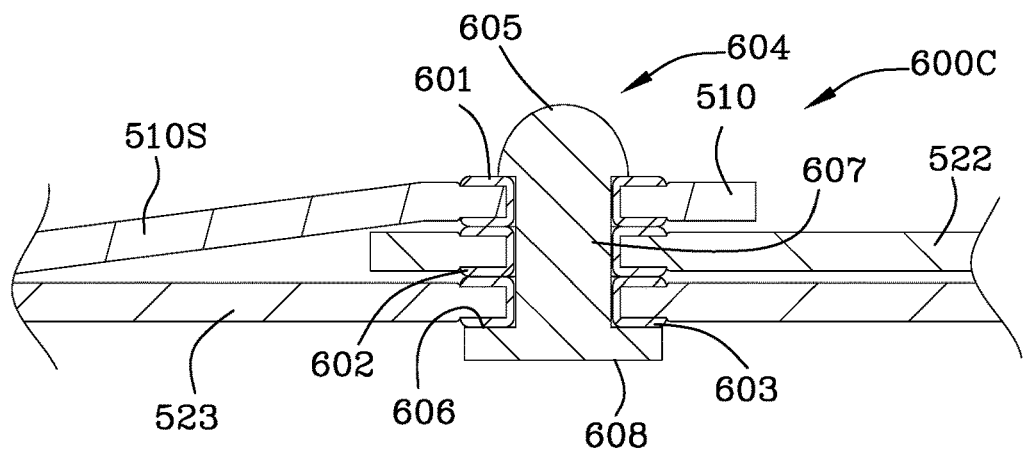
FIG. 6C is a schematic cross-sectional view similar to FIG. 6B together with a plug connector in the apertures.

FIG. 6C is a schematic cross-sectional view 600C similar to FIG. 6B together with a plug connector 604 in the grommets 601, 602, 603.

Figure 6D:
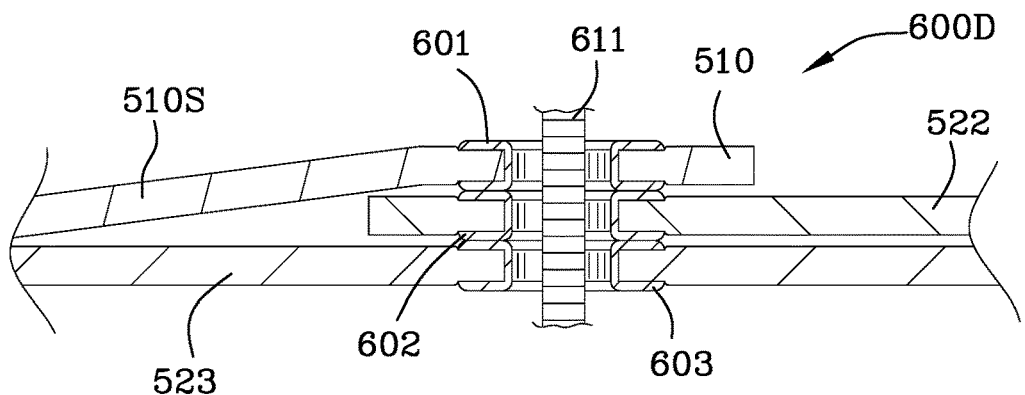
FIG. 6D is a schematic cross-sectional view similar to FIG. 6B together with a zip tie connector in the apertures.

FIG. 6D is a schematic cross-sectional view similar to FIG. 6B together with a zip tie 611 connector in the apertures 524F, 524E, 524D and 524A.

Figure 6E:
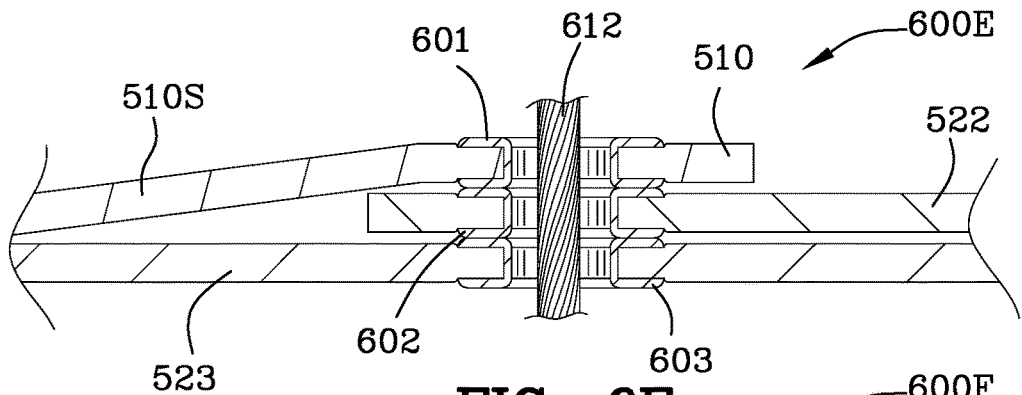
FIG. 6E is a schematic cross-sectional view similar to FIG. 6B together with a reinforced rope in the apertures.

FIG. 6E is a schematic cross-sectional view 600E similar to FIG. 6B together with a reinforced rope 612 in the apertures 524F, 524E, 524D and 524A.

Figure 6F:
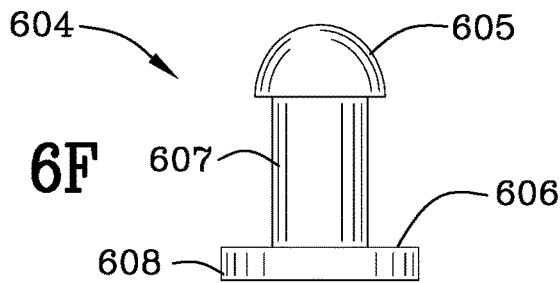
FIG. 6F is a front view of the plug connector.

FIG. 6F is a front view 600F of the plug connector 604. The plug connector 604 is made of a flexible material such as rubber or soft plastic. The plug style connector has a bulbous head 605, a first shoulder 614, a cylindrical shank 607, and a flange 608. Flange 608 has a shoulder 608. Referring to FIGS. 6A and 6C, shoulders 614 and 608 trap the flap 510 and the second encapsulation layer 523 slightly compressing the flap 510, the first encapsulation layer 522, and the second encapsulation layer 523 together.

Figure 5I:
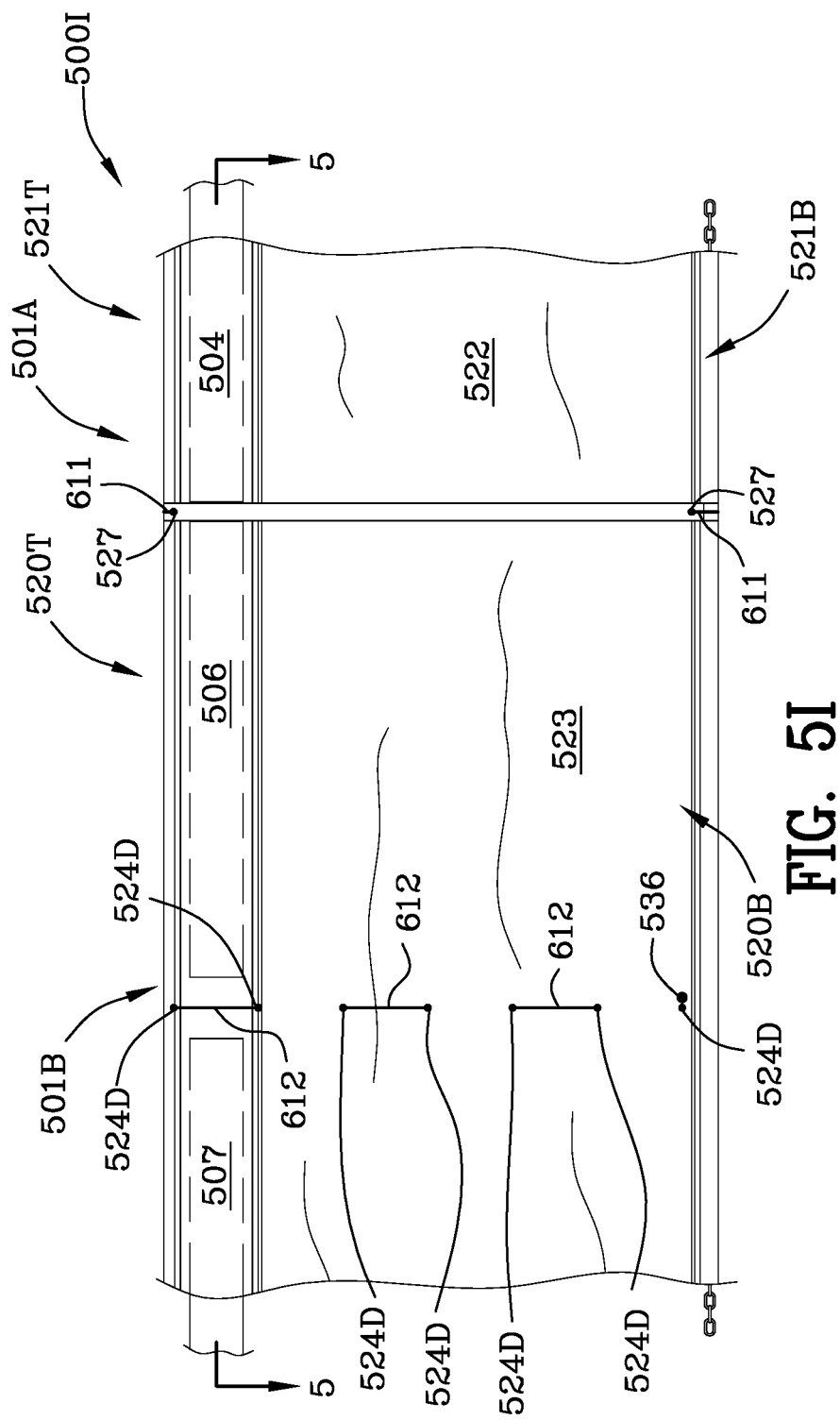
FIG. 5I is a view similar to FIG. 5A illustrating rope in the apertures of the primary connection and zip ties in the apertures of the secondary connection securing the flap, first encapsulation layer and second encapsulation layer together.

FIG. 5I is a view 500I similar to FIG. 5A illustrating rope 612 in the apertures 524D of the primary connection and zip ties 611 in the apertures 527 of the secondary connection securing the flap 510, first encapsulation layer 522 and second encapsulation layer together 523. Knot 536 is illustrated in the bottom aperture 524D. FIG. 5J is a view 500J similar to FIG. 5E illustrating rope 612 in the apertures of the primary connection and zip ties 611 in the apertures 528 of the secondary connection securing the flap 510, first encapsulation layer 522 and second encapsulation layer 523 together. Knot 537 is illustrated in this view as well. Many different knots may be tied and the knots 536, 537 shown herein are purely schematic.

Figure 5K:
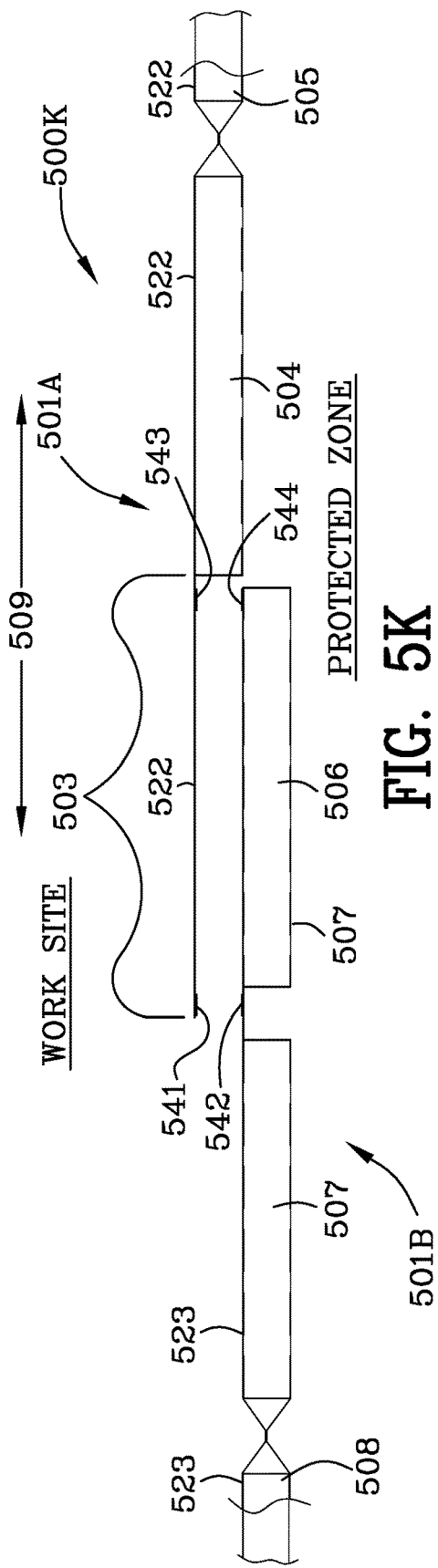
FIG. 5K is another schematic view of the first barrier section and the second barrier section in the uncoupled state.

FIG. 5K is another schematic view 500K of the first barrier section 501A and the second barrier section 501B in the uncoupled state. FIG. 5K illustrates the extension 503 of the first encapsulation layer 522 including at least one location with Velcro® 541, 543 affixed thereto. The Velcro® may be sewn into the first encapsulation layer 522 or it may be affixed using adhesive. Velcro® 541, 543 can be located anywhere on the mating face of the extension 503 as long as it mates with Velcro® 542, 544 on the mating face of the second encapsulation layer 523. The Velcro® may be sewn into the extension 503 or it may be affixed to the extension 503 using adhesive.

Still referring to FIG. 5K, the second encapsulation layer 523 includes at least one location 542, 544 with Velcro® affixed thereto. The Velcro® 541, 543 of the extension 503 of the first encapsulation layer engages Velcro® 542, 544 of the second encapsulation layer securing the first barrier section and the second barrier section together. Preferably, the Velcro® 541, 543 runs vertically along the full height of the extension 503 as illustrated in FIG. 5K. Preferably, the Velcro® 542, 544 runs vertically along the full height of the second encapsulation layer 523 as illustrated in FIG. 5K. When barrier sections 501A and 501B engage each other Velcro® 541 and Velcro® 542 engage and Velcro® 543 and Velcro® 544 engage thus securing barrier sections 501A and 501B.

Figure 5L:
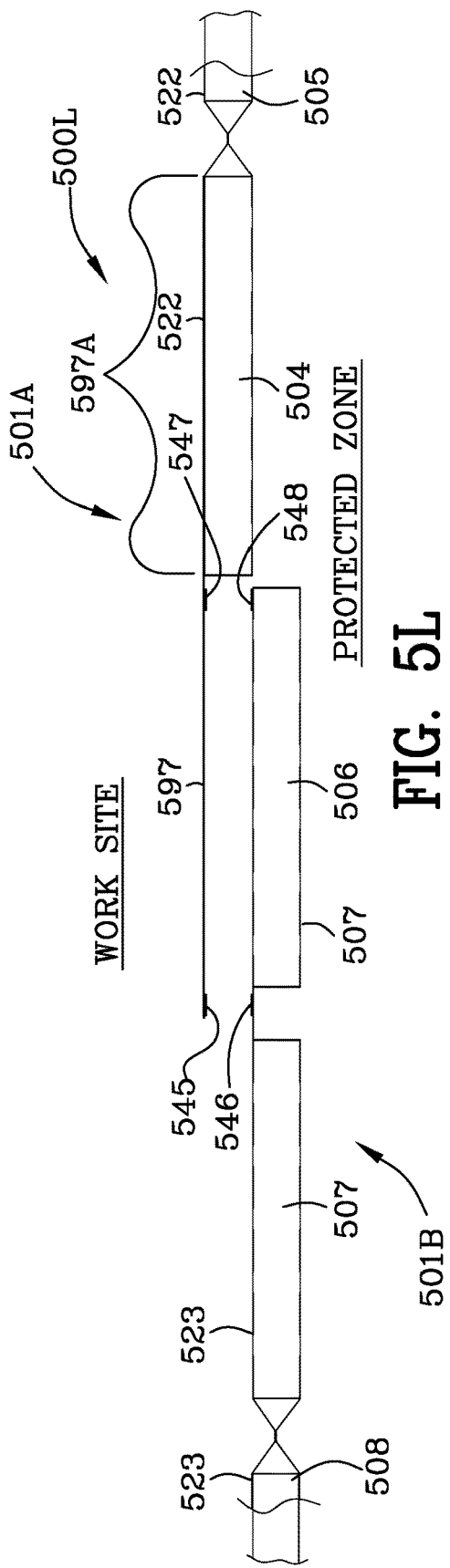
FIG. 5L is a schematic view similar to FIG. 5K with a connection layer affixed to the encapsulation layer of the first barrier section.

FIG. 5L is a schematic view 500L similar to FIG. 5K with a connection layer 597 affixed to the encapsulation layer 597A of the first barrier section. FIG. 5L illustrates the connection layer 597 heat sealed as denoted by reference numeral 597A of the first encapsulation layer 522 including at least one location with Velcro® 545, 547 affixed thereto. Velcro® 545, 547 can be located anywhere on the mating face of the extension 503 as long as it mates with Velcro® 546, 548 on the mating face of the second encapsulation layer 523. The Velcro® may be sewn into the connection layer 597 or it may be affixed to the extension using adhesive.

Still referring to FIG. 5L, the second encapsulation layer 523 includes at least one location 546, 548 with Velcro® affixed thereto. The Velcro® 545, 547 of the connecting layer 597 of the first encapsulation layer engages Velcro® 546, 548 of the second encapsulation layer securing the first barrier section and the second barrier section together. Preferably, the Velcro® 545, 547 runs vertically along the full height of the connector layer 597 as illustrated in FIG. 5L. Preferably, the Velcro® 546, 548 runs vertically along the full height of the second encapsulation layer 523 as illustrated in FIG. 5L. When barrier sections 501A and 501B engage each other Velcro® 545 and Velcro® 546 engage and Velcro® 547 and Velcro® 548 engage thus securing barrier sections 501A and 501B.

Additionally, the invention includes simply using a first barrier section and a second barrier section connected with Velcro®. The first barrier section includes a Velcro layer which extends the entire height of the section from top to bottom. The second section includes a flap which extends completely from the top to the bottom of the second section. The flap may be made of the same material as the first barrier section and the second barrier section. The flap and the first and second barrier sections may be made of PVC-coated polyester fabric. Other plastics and polymers may be used for the flap and the first and second barrier sections. A portion of the flap is affixed to the second section. The portion of the flap affixed to the second section is secured by adhesive or it may be heat welded. The flap has a bendable portion which may be manipulated with respect to the point of affixation to the second portion. The bendable portion includes Velcro® on the inner side of the flap. The Velcro on the inner side of the flap extends the entire height of the second. The flap of the second section is sufficiently wide and extends past one end portion of the second barrier section. Velcro® on the inner side of the flap of the second section engages the Velcro® of the first section. The Velcro® can cover the entire inside of the flap and also can cover a correspondingly large portion of the first section. Still additionally, the flap of the second section may be heat sealed to the first section.

Figure 5M:
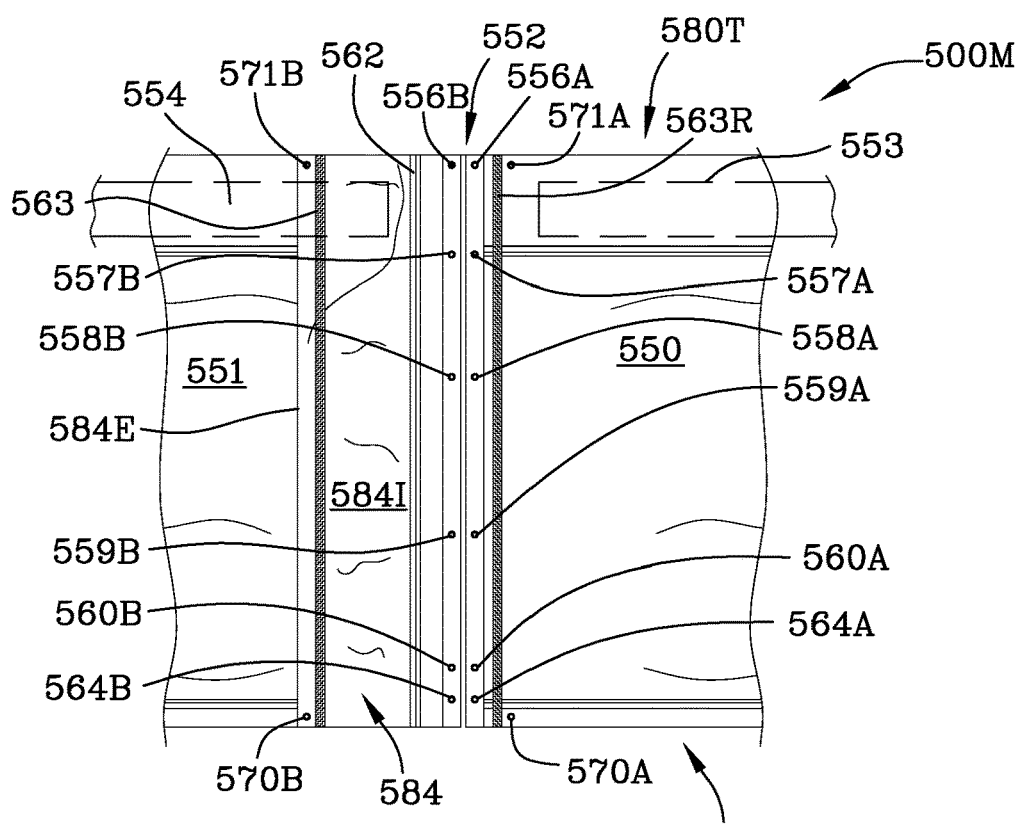
FIG. 5M is a front view of the first barrier section and the second barrier section near each other but not connected together with the flap open.

FIG. 5M is a front view 500M of the first barrier section 550 and the second barrier section 551 near each other but not connected together with the flap 584 open. Gap 552 is illustrated between the first barrier section 550 and the second barrier section 551. Grommets 556A, 557A, 558A, 559A, 560A, 564A are shown in the first barrier section 550. Each grommet supports an opening in the PVC coated fabric of the first barrier section 550. Grommets 556B, 557B, 558B, 559B, 560B, 564B are shown in the second barrier section 551. Each grommet supports an opening in the PVC coated fabric of the second barrier section 551. FIG. 5M also illustrates floats 553, 554 in phantom within correspondingly sized cavities within the PVC coated fabric 550, 551. Supplemental grommets 571A, 570A are illustrated in the first barrier section 550 and supplemental grommets 571B, 579B are illustrated in the flap 584. When the flap 584 is rotated and brought into the closed position as illustrated in FIG. 5Q, the grommets 571A, 571B are brought into alignment as are the grommets 570A, 570B. Grommets 571A, 571B are tied using a zip tie 582 or reinforced rope. Similarly, grommets 570A, 570B are tied using a zip tie 583 or reinforced rope.

Figure 5N:
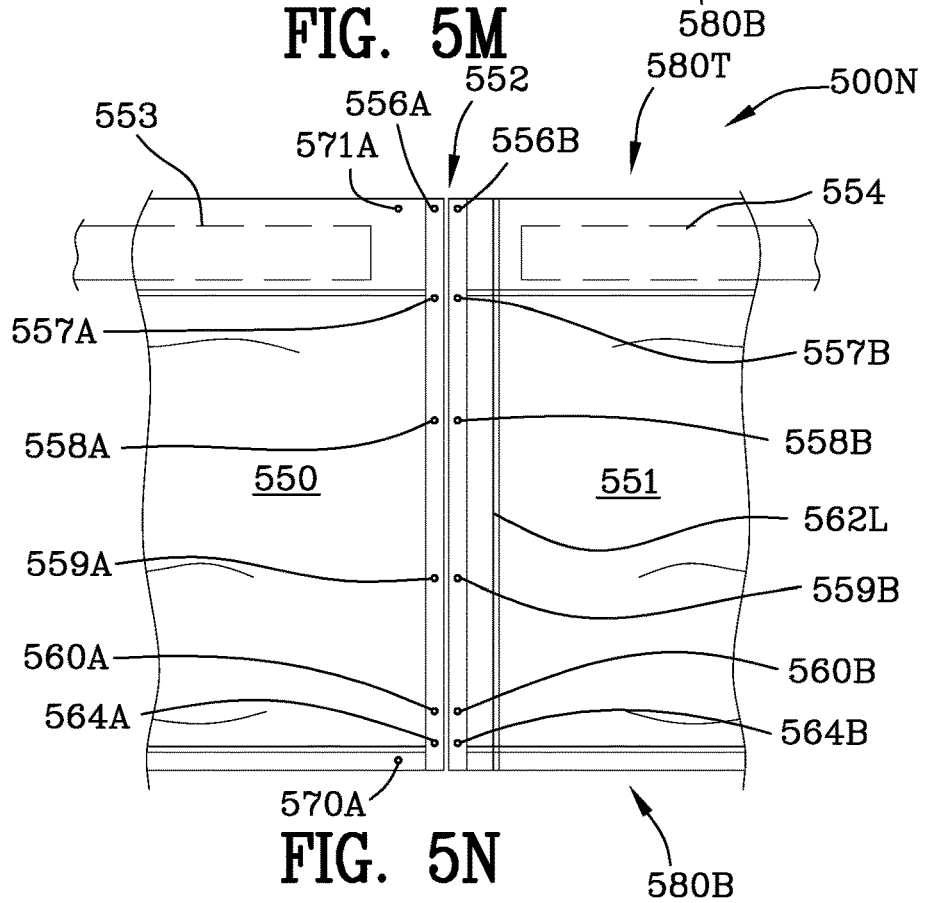
FIG. 5N is a rear view of FIG. 5M illustrating the first barrier section and the second barrier section of near each other but not connected together.

FIG. 5N is a rear view 500N of FIG. 5M illustrating the first barrier section 550 and the second barrier section 551 near each other but not connected together. Gap 552 illustrates that the sections 550, 551 are separated.

Still referring to FIG. 5M, a strip of Velcro 563 runs the vertical length (height) of the inside 584I of the flap 584. Reference numeral 580T indicates the top portion of the barrier sections 550, 551. Reference numeral 580B indicates the bottom portion of the barrier sections 550, 551. Edge 584E of flap 584 is illustrated lying partially over the second barrier section 551. It will be noticed that a portion of the flap 584 is over the material of the second barrier section 551 which covers float 554. FIG. 5R is a top view of the first barrier section and the second barrier section connected to each other with the flap 584 illustrated in the fully open position 586O partially covering the float 554 of the second barrier section 551. Portions of the flap 584 may rest against the material covering the float 554. For clarity, flap 584 is shown separated 584G from the material (encapsulation layer) covering the float. Dashed lines 586, 586A illustrate different positions of flap 584 as it is rotated 567R by hand during the installation process. FIG. 5T is an enlarged portion of FIG. 5R and illustrates the flap 584 curved around the float 554.

The spacing between the floats 553 and 554 may vary from 9 to 24 inches depending on the type of turbidity barrier. The flap itself extends about 6 inches in length. Other lengths may be used depending on the type of turbidity barrier used. The invention is useable on all types of turbidity barriers as the flap provides a rugged seal and connection of the first and second barrier sections.

Still referring to FIG. 5M, a strip of Velcro 563R runs the vertical length (height) of the first section 563R. The height of the barrier sections may be 5 feet high or it may be 12 feet high, perhaps even higher. Essentially, the barrier sections may be any size. All of the different sizes include ballast (chains) or weights. Velcro 563R receives Velcro 563 on the inside 584I of the flap 584 and secures the flap to the first barrier section 550. See FIGS. 5S and 5U. Flap 584 covers the grommets 556A, 557A, 558A, 559A, 560A, 564A, 556B, 557B, 558B, 559B, 560B, 564B and seals joint between barrier sections 550, 551. Sometimes Velcro is referred to as having a male side which is the rough or hard side and the female side is referred to as the loop or soft side. Velcro 563 can be the male or female portion with Velcro 563 being the female or male portion. So if the Velcro 563 on the flap is the male portion, then the Velcro on the barrier section 550 is the female portion. And, if the Velcro 563R on the barrier section is the male portion, then the Velcro 563 on the flap is the female portion. As described herein the Velcro 563R is the receiving Velcro or the female portion, and the Velcro 563 on the flap is the male portion.

Figure 5O:
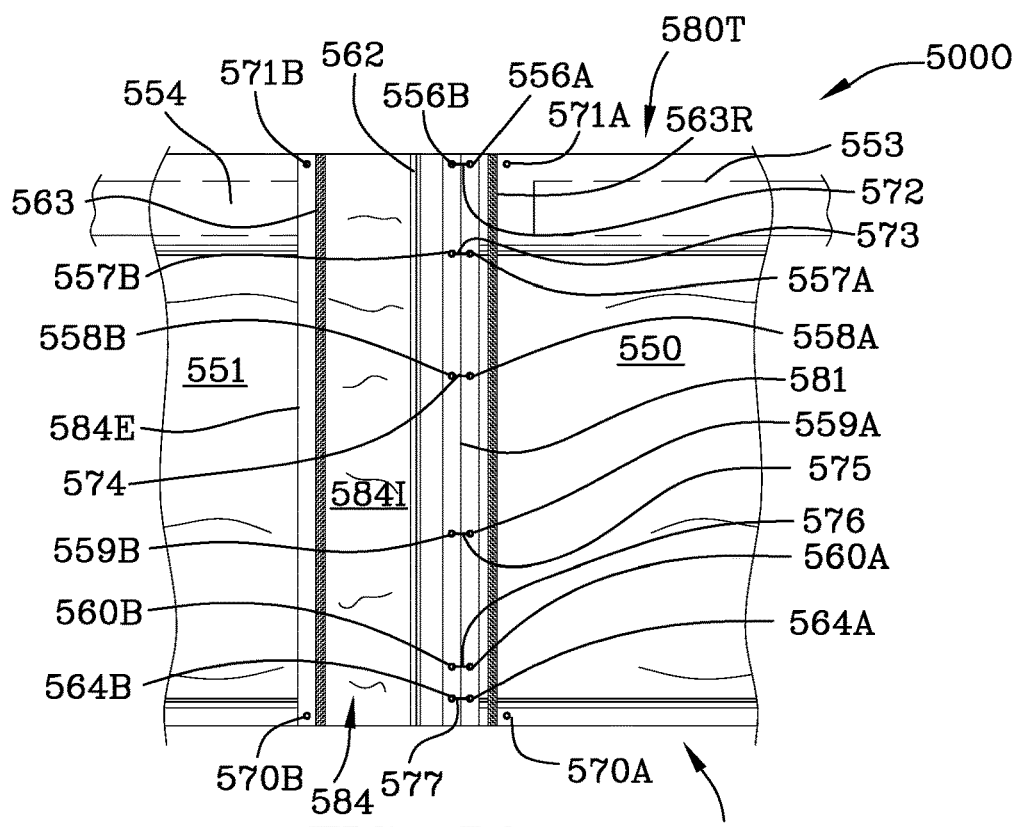
FIG. 5O is a front view of the first barrier section and the second barrier section near each other connected together with the flap open.
Figure 5P:
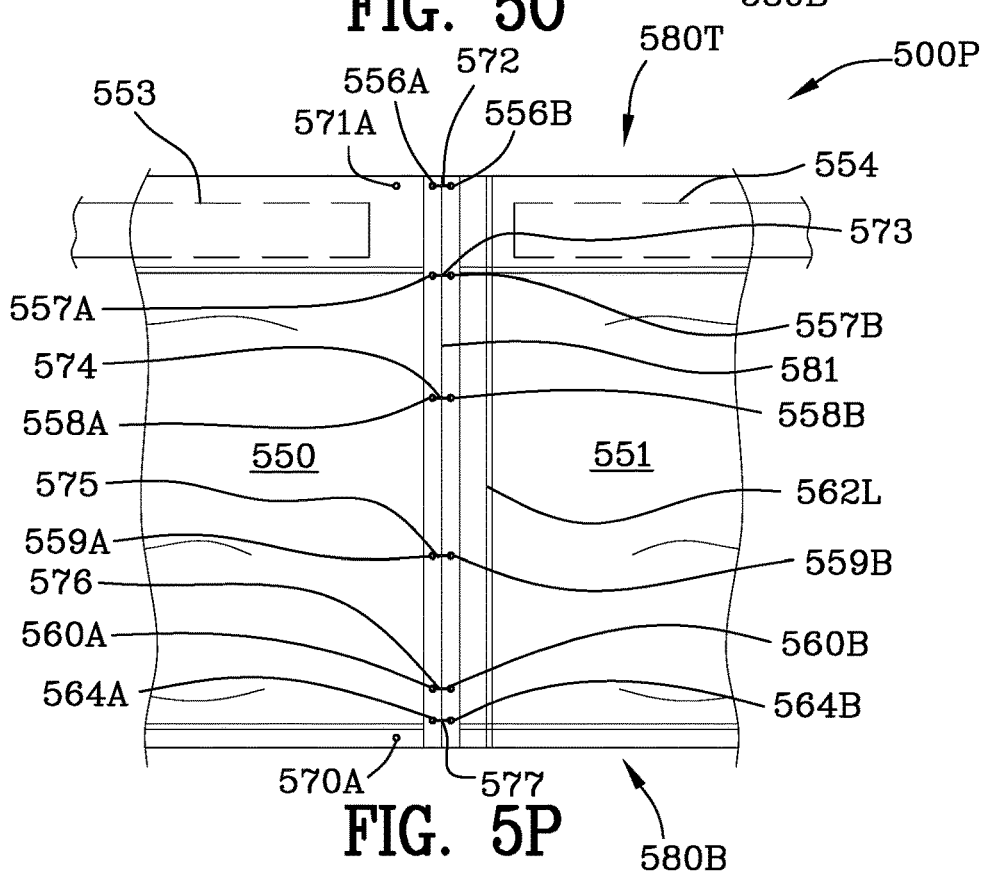
FIG. 5P is a rear view of FIG. 5O illustrating the first barrier section and the second barrier section near each other connected together.
Figure 5T:
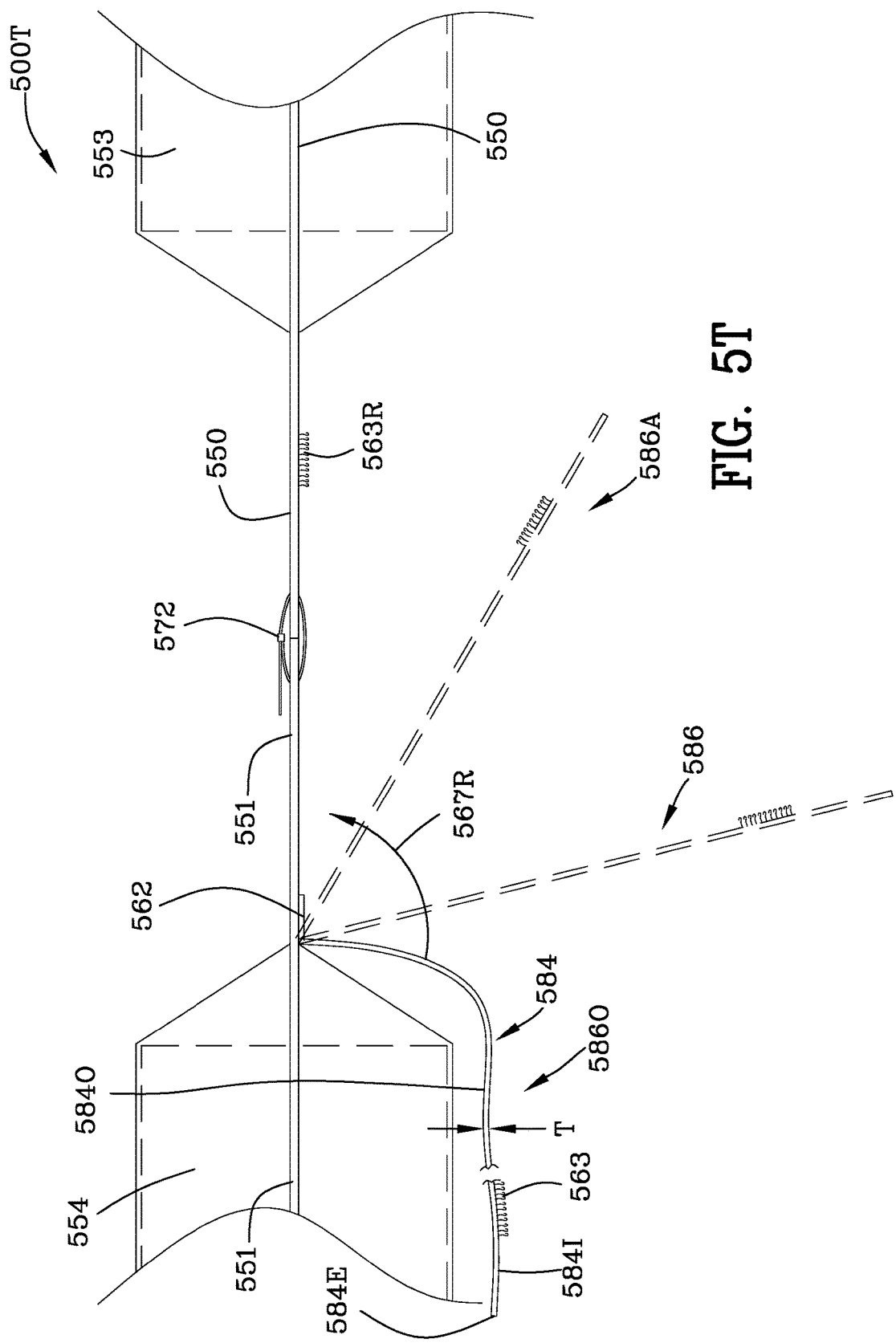
FIG. 5T is an enlarged portion of FIG. 5R illustrating the Velcro on the interior of the flap, a portion of the flap affixed to the second barrier section, and Velcro on the first barrier section.

FIG. 5O is a front view 500O of the first barrier section 550 and the second barrier section 551 near each other connected together with the flap 684 open. FIG. 5O illustrates zip ties 572, 573, 574, 575, 576, 577 connecting the grommets 556A, 557A, 558A, 559A, 560A, 564A of the first barrier section 550 to the respective grommets 556B, 557B, 558B, 559B, 560B, 564B of the second barrier section 551. Gap 552 is not present in FIG. 5O. Also see FIGS. 5R, 5S, 5T and 5U to view the flap 584 from the top looking down on the connected barrier sections. FIG. 5P is a rear view 500P of the first barrier section 550 and the second barrier section 551 near each other connected together.

Figure 5U:
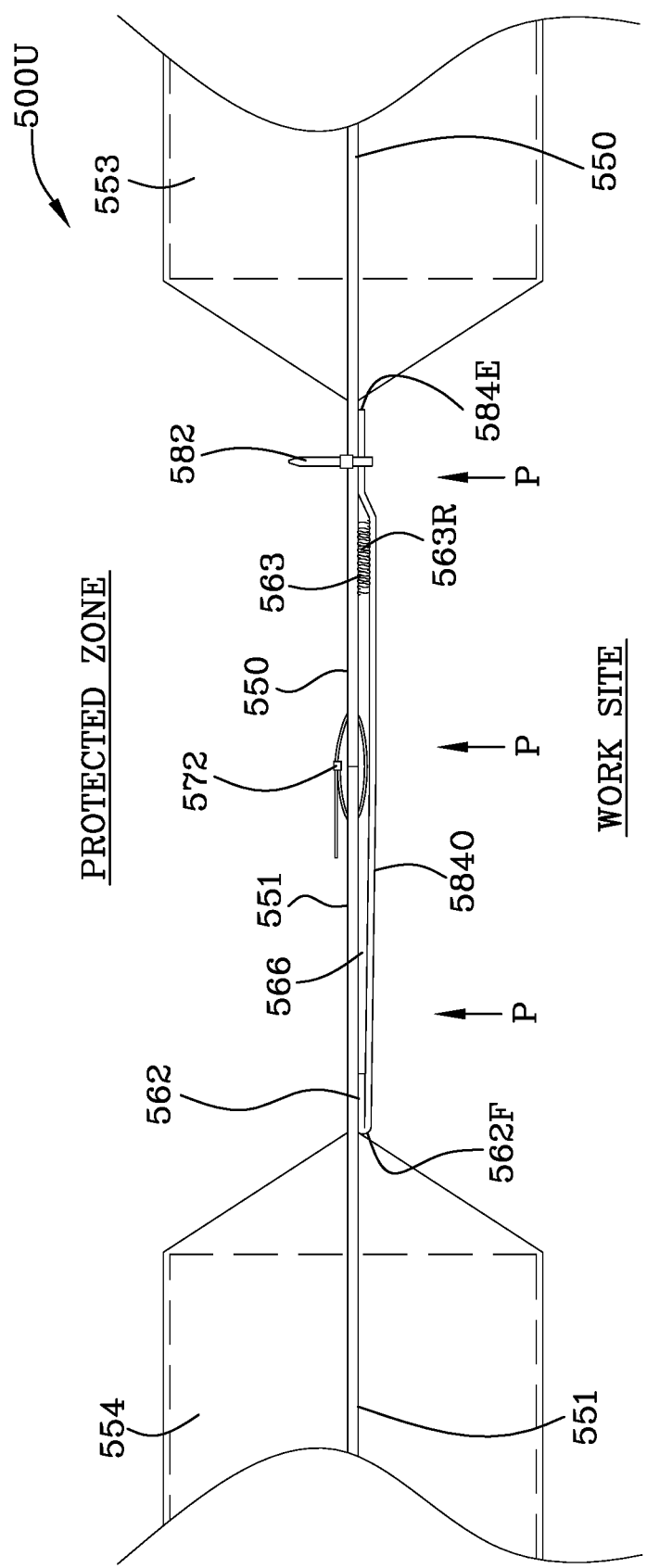
FIG. 5U is an enlarged portion FIG. 5S illustrating the flap closed with the Velcro of the flap engaging the Velcro of the first barrier section, a supplemental zip tie securing the flap to the first barrier section, and a zip tie securing the first barrier section and the second barrier section together.

FIG. 5Q is a front view 500Q of the first barrier section 550 and the second barrier section 551 connected to each other with the flap 584 closed and the joint between sections 550, 551 sealed together. FIG. 5Q illustrates the folded portion 562F of the flap 584, the edge 584E and the outside 584O. The flap 584 runs from the top portion 580T to the bottom portion 580B of the turbidity barrier. The flap 584 extends well above the water line of the turbidity barrier. The water line is typically in the vicinity of the location of the floats, 551, 550. Referring to FIG. 5M, heat welded portion 562 of the flap 584 is affixed to the encapsulation layer of second section 551 as illustrated. FIG. 5U illustrates the folded end 562F of flap 584 which is folded back over the heat welded portion 562 of the flap 584. When the flap 584 is rotated or pulled to the position illustrated in FIG. 5U securing the flap 584 to the Velcro 563R of the first barrier section 550, the connection of the barrier sections is sealed. Referring to the rear views of FIGS. 5N and 5O, the heat welded portion is visible as a line 562L in the PVC coated fabric of section 551.

FIG. 5S is a top view 500S of the first barrier section 550 and the second barrier section 551 connected to each other with the flap 584 closed. FIG. 5U is an enlarged portion FIG. 5S illustrating the flap 584 closed with the Velcro 563 of the inside portion 584I of the flap 584 engaging the Velcro of the first barrier section 563R, a supplemental zip tie 582 securing the flap 584 to the first barrier section 550, and a zip tie 572 securing a grommet of the first barrier section 550 and a grommet of the second barrier section 551 together. The Velcro 563 may be stitched into the flap 584, adapted for heat welding to the flap 584 using a proper base material, or glued to the flap 584. Similarly, Velcro 563R may be stitched into the section 550, adapted for heat welding to the section 550 using a proper base material, or glued to the section 550. PVC cement is an excellent glue.

Referring to FIGS. 5S and 5U, they illustrate the flap closed with the Velcro 563 of the flap 584 engaging the Velcro 563R of the first barrier section, a supplemental zip tie 582 securing the flap 584 to the first barrier section 550, and a zip tie 582 securing the first barrier section 550 and the second barrier section 551 together.

A small gap 566 exists between the flap 584 and the first 550 and second 551 sections of the barrier as illustrated in FIG. 5U. Velcro on the inside of the flap 563 is secured to and interengages Velcro 563R. One of the zip ties 572 is shown securing the first and second sections together. The zip ties are secured on the rear side of the turbidity barrier as illustrated in FIGS. 5P, 5R, 5S, 5T and 5U. The water with contaminants asserts a pressure caused by rainwater and construction materials introduced into the water body against the flap 584 pushing the flap and the Velcro 563 into engagement with the section 550, 551, and the Velcro 563R thus securing the flap to the first section 550. Referring to FIG. 5U, water pressure is denoted by arrows P. The water pressure P tends to push portions of the flap 584I into engagement with the barrier sections 550 and 551 thus further sealing the connection. The flap 584 may be made of the same PVC-coated fabric used for the encapsulation layer of the barrier sections 550, 551. The thickness T of the flap 584 may be thicker or thinner than the PV coated fabric used in the encapsulation material of the barrier sections. Other materials may be used for the flap and for the barrier sections. The potential materials of the flap and/or barrier sections are too numerous to be mentioned here and virtually any materials may be used without departing from the spirit and the scope of the invention as disclosed. For example cloth, other oil absorbent materials, etc. may be used. The interlocking Velcro together with the remainder of the structure illustrated in FIGS. 5M to 5U secures the barrier sections 550, 551. Referring to FIG. 5R, arrow 567R indicates the rotation of the flap 584 from the position of FIG. 5T (open) to the position of FIG. 5S (closed).

Reinforcing rope is sometimes used in association with grommet interconnections. The rope is typically embedded in the barrier sections. The rope adds strength.

The invention further contemplates a turbidity barrier assembly process comprising the steps of:

arranging the first barrier section proximity with the second barrier section, said first and second barrier sections have grommets supporting a plurality of apertures in the first and second sections;

affixing the grommets of the first section to the grommets of the second section;

positioning the flap of the second barrier section into engagement with the first barrier section;

securing Velcro of the first barrier section to Velcro of the second barrier section and, affixing the flap of the second section to the first section.

Referring to FIGS. 5G, 5H, 5K and 5L, the WORK SITE and PROTECTED ZONES are identified. There will be a light pressure differential if there is any water flow in the direction of the PROTECTED ZONE from the WORK SITE. The higher pressure in the WORK SITE area applies pressure to either the extension 503 or the connection layer 597 which tends to seal the extension 503 or the connection layer 597 against the second encapsulation layer 523.

REFERENCE NUMERALS

100—front view of prior art turbidity barrier sections connected together
101—reinforced rope
102, 103—floats
104—eyelet
105—gaps
106—chain
109, 109A—PVC coated fabric
110, 111—turbidity barrier sections
200—front view of prior art turbidity barrier sections connected together
201—reinforced rope
201C—quick connector
202, 203—floats
204—eyelets
206—chain
207—chain
209, 209A—PVC coated fabric
210, 211—turbidity barrier sections
300—front view of prior art turbidity barrier sections connected together
301—metal connector
302, 303—floats
306—chain
307, 308—turbidity barrier sections
309, 309A—PVC coated fabric
400—top view 400 of turbidity barrier sections connected together
401—central connection
402, 403—floats
404, 405—turbidity barrier sections
500—cross-sectional view of the first and second sections of the turbidity barrier 599 taken along the lines 5-5 of FIG. 5A of the first embodiment
500A—front view of the first 501A and second 501B sections of the of the turbidity barrier 599 of the first embodiment
500B—is an enlarged portion 500B of a portion of FIG. 5
500C—is an enlarged portion 500C of a portion of FIG. 5
500D—view similar to FIG. 5C illustrating a second encapsulation layer 598 in the connection.
500E—side view 500E of the of the turbidity barrier 599
500F—view illustrating a plurality of floats in the first barrier section 501A and the second barrier section 501B
500G—is a schematic view of the first barrier section and the second barrier section in the uncoupled state.
500I—is a view similar to FIG. 5A illustrating rope in the apertures of the primary connection and zip ties in the apertures of the secondary connection securing the flap, first encapsulation layer and second encapsulation layer together
500J is a view similar to FIG. 5E illustrating rope in the apertures of the primary connection and zip ties in the apertures of the secondary connection securing the flap, first encapsulation layer and second encapsulation layer together
500K—a schematic view of the first barrier section and the second barrier section in the uncoupled state
500L—a schematic view similar to FIG. 5K with a connection layer affixed to the encapsulation layer of the first barrier section
500M—front view of the first barrier section and the second barrier section near each other but not connected together with the flap open
500N—rear view of the of FIG. 5M illustrating the first barrier section and the second barrier section of near each other but not connected together
500O—front view of the first barrier section and the second barrier section near each other connected together with the flap open 500P—rear view of the first barrier section and the second barrier section near each other connected together
500Q—front view of FIG. 5P illustrating the first barrier section and the second barrier section connected to each other with the flap closed
500R—top view of the first barrier section and the second barrier section connected to each other with the flap illustrated in several positions
500S—top view of the first barrier section and the second barrier section connected to each other with the flap closed
500T—enlarged portion of FIG. 5R
500U—enlarged portion of FIG. 5U
501A—first turbidity barrier section
501B—second turbidity barrier section
502—first encapsulation layer
503—first encapsulation layer latitudinal extension
504, 505—first portion of plurality floats of said first turbidity barrier section
506—second portion of plurality floats of said second turbidity barrier section, one second turbidity barrier section float
507, 508—first portion of plurality floats of said first turbidity barrier section
509—latitudinal direction arrow
510—flap of the second turbidity barrier section
510S—portion of the flap 510 secured to the second encapsulation layer 511 of the turbidity barrier section
520T—top portion of the second turbidity barrier section 501B
520B—bottom portion of the second turbidity barrier section 501B
521T—top portion of the turbidity barrier of the first turbidity barrier section 501A
521B—bottom portion of the turbidity barrier of the first turbidity barrier section 501A
522—PVC coated fabric (encapsulation layer) covering the first turbidity barrier section 501A;
523—PVC coated fabric (encapsulation layer) covering turbidity barrier section 501B;
524—first plurality of through apertures in the encapsulation layer of the second turbidity barrier section 501B;
524A—additional aperture in the additional encapsulation layer 598
524D—aperture in the second encapsulation layer 523
524E—aperture in the extension 503 of the first encapsulation layer 522
524F—aperture in the flap 510
527—second plurality of through apertures in the encapsulation layer of the second turbidity barrier section 501B;
528—first plurality of through apertures in the encapsulation layer of the first turbidity barrier section 501A;
536, 537—knot in rope 612
541, 542, 543, 544, 545, 546, 547, 548—Velcro, a registered trademark of VELCRO INDUSTRIES B.V. LIMITED LIABILITY COMPANY ASSIGNEE OF NETHERLANDS CASTORWEG 22-24 CURACAO NETHERLANDS
550—first barrier section
551—second barrier section
552—gap
553—float
554—float
556A, 557A, 558A, 559A, 560A, 564A—grommet in first barrier section
556B, 557B, 558B, 559B, 560B, 564B—grommet in second barrier section
561A—plurality of floats in a first portion
561B—second portion comprising just one float
562—heat weld of flap 584 to the encapsulation layer of 551
562F—folded end of flap 584
562L—rear view of the heat weld of flap 584
563—Velcro layer on the inside 584I of flap 584
563R—Velcro layer on the first barrier section 550
566—gap between the flap 584
567R—arrow indicating the rotation of the flap from the position of FIG. 5T (open) to the position of FIG. 5S (closed)
570A, 571A—supplemental grommet in the first barrier section 550
570B, 571B—supplemental grommet in the second barrier section 551
572, 573, 574, 575, 576, 577, 582, 583—zip ties
580B—arrow indicating the bottom portion of the turbidity barrier
580T—arrow indicating the top portion of the turbidity barrier
584E—edge of flap 584
584I—inside of flap 584
584O—outside of flap 584
597—a connection layer affixed to the first barrier section
597A—portion of connection layer 597 which is heat welded to the encapsulation layer 522
598—an additional encapsulation layer
599—a turbidity barrier
600—a cross-sectional schematic of the flap 510, the first encapsulation layer of the first barrier section, and the second encapsulation layer of the second barrier section, and an additional layer of the second barrier section aligned such that the apertures of each layer are aligned
600A—a cross-sectional view of FIG. 6 with a connecting plug 604 in the apertures
600B—a cross-sectional schematic view of the flap 510, the first encapsulation layer of the first barrier section, and the second encapsulation layer of the second barrier section
600C—a cross-sectional schematic view of FIG. 6B with a connecting plug in the apertures
600D—a cross-sectional schematic view of FIG. 6B with a connecting zip tie in the apertures
600E—a cross-sectional schematic view of FIG. 6B with a connecting reinforced rope in the apertures
600E—front view of flexible plug connector
601, 602, 603—grommets in apertures of flexible layers
604—flexible plug connector
605—mushroom head of plug connector
606—shank of plug connector
607—top surface of flange 608 of the plug connector
608—flange of the plug connector
611—zip tie
612—reinforced rope
P—pressure arrows
T—thickness

The invention claimed is:
1. A floating turbidity barrier, comprising:
a first barrier section and a second barrier section;
said first barrier section includes a first top portion, a first bottom portion and a first length;
said first barrier section includes a first plurality of floats;

said second barrier section includes a second plurality of floats;

said second barrier section includes a second top portion, a second bottom portion and a second length;

said first plurality of floats of said first barrier section linked together, a first portion of said first plurality of floats are linked together in proximity with each other, a second portion of said first plurality of floats comprises one float; and, said one float of said second portion of said first plurality of floats linked together with, and, spaced apart from, said first portion of said first plurality of floats;

said second plurality of floats of said second barrier section linked together, a first portion of said second plurality of floats are linked together in proximity with each other, a second portion of said second plurality of floats comprises one float; and, said one float of said second portion of said second plurality of floats linked together with, and, spaced apart from, said first portion of said second plurality of floats;

said first barrier section includes a first encapsulation layer, said first encapsulation layer encapsulating said first plurality of floats, said first encapsulation layer extending about said first plurality of floats of said first barrier section and above said first plurality of floats to said top portion of said first barrier section and below said first plurality of floats to said bottom portion of said first barrier section, and, said first encapsulation layer includes a first latitudinal extension extending beyond said first plurality of floats for connection with said second barrier section;

said second barrier section includes a second encapsulation layer; said second encapsulation layer encapsulating said second plurality of floats, said second encapsulation layer extending about said first plurality of floats of said second barrier section and above said plurality of floats to said top portion of said second barrier section and below said plurality of floats to said bottom portion of said second barrier section; and, said first plurality of floats, and, said second encapsulation layer includes a second latitudinal extension extending beyond said second plurality of floats;

said first encapsulation layer includes a first flap, said first flap is partially heat sealed to said first encapsulation layer, said partially heat sealed first flap extends from said top portion of said first barrier section to said bottom portion of said first barrier section;

said second encapsulation layer includes a second flap affixed thereto, said second flap is partially heat sealed to said second encapsulation layer, said partially heat sealed second flap extends from said top portion of said second barrier section to said bottom portion of said second barrier section;

said first latitudinal extension of said first encapsulation layer overlapping and engaging said second encapsulation layer of said second barrier section, said first latitudinal extension of said first encapsulation layer partially resides between said second flap partially affixed to said second encapsulation layer and said second encapsulation layer;

said second flap engages said first latitudinal extension of said first barrier section; and, said second flap, said first latitudinal extension of said first encapsulation and said second encapsulation layer include apertures therein secured together thus securing said first and said second barrier sections together.

2. The floating turbidity barrier as claimed in claim 1, further comprising:
rope through said apertures of said second flap, said apertures of said first latitudinal extension of said first encapsulation and said second encapsulation layer to secure said second flap, said first latitudinal extension of said first encapsulation and said second encapsulation layer.

3. The floating turbidity barrier as claimed in claim 2 wherein said first encapsulation layer and said second encapsulation layer are sealed.

4. The floating turbidity barrier as claimed in claim 1, further comprising:
zip ties through said apertures of said second flap, said apertures of said first latitudinal extension of said first encapsulation and said second encapsulation layer to secure said second flap, said first latitudinal extension of said first encapsulation and said second encapsulation layer.

5. The floating turbidity barrier as claimed in claim 4 wherein said first encapsulation layer and said second encapsulation layer are sealed.

6. The floating turbidity barrier as claimed in claim 1, further comprising:
plugs through said apertures of said second flap, said apertures of said first latitudinal extension of said first encapsulation and said second encapsulation layer to secure said second flap, said first latitudinal extension of said first encapsulation and said second encapsulation layer.

7. The floating turbidity barrier as claimed in claim 6 wherein said first encapsulation layer and said second encapsulation layer are sealed.

8. The floating turbidity barrier as claimed in claim 1, further comprising:
interconnection of said first section of said turbidity barrier and said second section of said turbidity barrier occurs between said one float of said second portion of said second plurality of floats linked together with, and, spaced apart from, and said first portion of said second plurality of floats.

9. The floating turbidity barrier as claimed in claim 1, further comprising:
said one float of said second portion of said second plurality of floats of said second barrier section resides in proximity to said first plurality of floats of said first barrier section.

10. The floating turbidity barrier as claimed in claim 1, further comprising:
a hook and loop fastener including a hook portion and a loop portion;
said extension of said first encapsulation layer includes at least one location with a hook and loop portion of said hook and loop fastener affixed thereto; and,
said second encapsulation layer includes at least one location with a hook and loop portion of said hook and loop fastener affixed thereto;
and, said a hook and loop portion of said hook and loop fastener of said extension of said first encapsulation layer engages a hook and loop portion of said hook and loop fastener of said second encapsulation layer securing said first barrier section and said second barrier section together.

11. A floating turbidity barrier, comprising:
a first barrier section and a second barrier section;
said first barrier section includes a first top portion, a first bottom portion and a first length;

said first barrier section includes a first plurality of floats;

said second barrier section includes a second top portion, a second bottom portion and a second length;

said second barrier section includes a second plurality of floats;

said first plurality of floats of said first barrier section linked together, a first portion of said first plurality of floats are linked together in proximity with each other, a second portion of said first plurality of floats comprises one float; said one float of said second portion of said first plurality of floats linked together with and spaced apart from, said first portion of said first plurality of floats;

said second plurality of floats of said second barrier section linked together, a first portion of said second plurality of floats are linked together in proximity with each other, a second portion of said second plurality of floats comprises one float; said one float of said second portion of said second plurality of floats linked together with and spaced apart from, said first portion of said second plurality of floats;

said first barrier section includes a first encapsulation layer, said first encapsulation layer encapsulating said first plurality of floats of said first barrier section, said first encapsulation layer extending about said first plurality of floats and above and below said first plurality of floats, and, a first connection layer of said first barrier section affixed to said first encapsulation layer of said first barrier section extending latitudinally beyond said first plurality of floats;

said second barrier section includes a second encapsulation layer, said second encapsulation layer encapsulating said second plurality of floats of said second barrier section, said second encapsulation layer extending about said second plurality of floats and above and below said second plurality of floats, and, a second connection layer affixed to said second encapsulation layer of said second barrier section extending latitudinally beyond said second plurality of floats;

said first connection layer includes a first flap which is partially heat sealed to said encapsulation layer, said partially heat sealed first flap extends from said top of said first barrier section to said bottom of said first barrier section;

said connection layer of said first barrier section overlapping and engaging said second encapsulation layer of said second barrier section;

said connection layer of said first barrier section partially resides between said second flap of said second barrier section and said second encapsulation layer;

said second flap engages said connection layer of said first barrier section; and, said second flap, said connection layer of said first barrier section and said second encapsulation layer include apertures therein secured together.

12. The floating turbidity barrier as claimed in claim 11, further comprising:

a hook and loop fastener including a hook portion and a loop portion;

said connection layer of said first barrier section includes at least one location with a hook and loop portion of said hook and loop fastener affixed thereto;

said second encapsulation layer includes at least one location with a hook and loop portion of said hook and loop fastener affixed thereto;

and, said a hook and loop portion of said hook and loop fastener of said connection layer of said first barrier section engages a hook and loop portion of said hook and loop fastener of said second encapsulation layer securing said first barrier section and said second barrier section together.

13. A floating turbidity barrier, comprising:

a first barrier section and a second barrier section;

a fastener, said fastener includes a hook portion having hooks and a loop portion having loops;

one of said portions of said fastener is affixed to a portion of said first barrier;

said second barrier section includes a flexible flap, a portion of said flexible flap is heat sealed to said second barrier section, said flexible flap extends past said second barrier section in a direction toward said first barrier section, said flexible flap includes the other of said portions of said fastener on an inside portion of said flexible flap, and, said other of said portions of said fastener on said inside portion of said flexible flap engages said one of said portions of said fastener affixed to said portion of said first barrier section;

said first barrier section includes first grommets and said second barrier section includes second grommets;

a plurality of grommet connectors;

each of said first grommets and each of respective ones of said second grommets are connected together using one of said plurality of grommet connectors securing said first barrier section and said second barrier section together;

a portion of said flexible flap of said second barrier section covers said connected first and second grommets;

said one of said portions of said fastener and said other of said portions of said fastener are connected together; and, a portion of said flexible flap is sealed to said first barrier section by said fastener.

14. The floating turbidity barrier as claimed in claim 13, further comprising:

said flexible flap of said second barrier section includes supplemental grommets;

said first barrier section includes supplemental grommets;

said supplemental grommets of said flexible flap are affixed to said supplemental grommets using ones of said plurality of grommet connectors securing said flap of said second barrier section to said first barrier section.

15. The floating turbidity barrier as claimed in claim 13, further comprising:

said flexible flap is rotatable.

16. The floating turbidity barrier as claimed in claim 13, further comprising:

said grommet connectors are flexible plugs.

17. The floating turbidity barrier as claimed in claim 13, further comprising:

said grommet connectors are zip tie.

18. The floating turbidity barrier as claimed in claim 13, further comprising:

said grommet connectors are ropes.

19. The floating turbidity barrier as claimed in claim 13, further comprising:

said first barrier section includes a first side and a second side, said first side is exposed to a work site area and said second side is exposed to a protected natural area;

said second barrier section includes a first side and a second side, said first side is exposed to a work site area and said second side is exposed to a protected natural area;

said work site includes water and contaminants therein which are confined;

said protected natural area includes environmentally sensitive natural water; and, the water pressure in said work site area is slightly greater than the water pressure in the protected natural area.

20. A floating turbidity barrier as claimed in claim 13, further comprising:

said one of said portions of said fastener is affixed to said portion of said first barrier with adhesive and said other of said portions of said fastener is affixed to said inside portion of said flap with adhesive.

21. A floating turbidity barrier as claimed in claim 13, further comprising:

said one of said portions of said fastener is affixed to said portion of said first barrier with stitching and said other of said portions of said fastener is affixed to said inside portion of said flap with stitching.

\* \* \* \* \*